US012132250B2

(12) United States Patent
Lim et al.

(10) Patent No.: US 12,132,250 B2
(45) Date of Patent: Oct. 29, 2024

(54) ANTENNA MODULE AND ELECTRONIC DEVICE INCLUDING THE SAME

(71) Applicant: SAMSUNG ELECTRONICS CO., LTD., Suwon-si (KR)

(72) Inventors: Gunbae Lim, Suwon-si (KR); Yongsang Yun, Suwon-si (KR); Seongjin Park, Suwon-si (KR); Jaebong Chun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 145 days.

(21) Appl. No.: 17/941,218

(22) Filed: Sep. 9, 2022

(65) Prior Publication Data

US 2023/0079082 A1 Mar. 16, 2023

Related U.S. Application Data

(63) Continuation of application No. PCT/KR2022/012866, filed on Aug. 29, 2022.

(30) Foreign Application Priority Data

Sep. 15, 2021 (KR) ........................ 10-2021-0123049

(51) Int. Cl.

*H01Q 1/24* (2006.01)
*H01Q 9/04* (2006.01)
*H01Q 21/08* (2006.01)

(52) U.S. Cl.

CPC ........... *H01Q 1/243* (2013.01); *H01Q 9/0407* (2013.01); *H01Q 21/08* (2013.01)

(58) Field of Classification Search

CPC ........ H01Q 1/24; H01Q 1/243; H01Q 1/2283; H01Q 9/0407; H01Q 21/08

See application file for complete search history.

(56) References Cited

U.S. PATENT DOCUMENTS 10,986,908 B2 4/2021 Hwang
11,133,595 B2 9/2021 Park et al.
(Continued)

FOREIGN PATENT DOCUMENTS

JP 2016086260 A 5/2016
KR 20190009232 A 1/2019
(Continued)

OTHER PUBLICATIONS

International Search Report and Written Opinion for International Application No. PCT/KR2022/012866; Date of Search: Nov. 23, 2022; with English Translation of Search; 9 pages.
(Continued)

*Primary Examiner* — Hoang V Nguyen
(74) *Attorney, Agent, or Firm* — CANTOR COLBURN LLP

(57) ABSTRACT

Electronic devices including an antenna module and the antenna module are presented. The electronic devices may include a housing, a wireless communication module, a plurality of slits provided in the housing, and an antenna module disposed inside the housing to correspond to the plurality of slits and operatively connected to the wireless communication module. The antenna module may include a printed circuit board, a plurality of conductive patches disposed on a first surface of the printed circuit board, and an RFIC disposed on a second surface of the printed circuit board. The plurality of conductive patches are configured to be disposed in the plurality of slits. As a result, it is possible to secure a space for disposing different electronic components included in the electronic device.

18 Claims, 22 Drawing Sheets

(56) References Cited

U.S. PATENT DOCUMENTS

| | | | | |
|---|---|---|---|---|
| 11,145,949 | B2 | 10/2021 | Baek et al. | |
| 11,502,413 | B2 | 11/2022 | Park et al. | |
| 11,533,815 | B2 | 12/2022 | Kim et al. | |
| 2019/0027804 | A1 | 1/2019 | Kim et al. | |
| 2019/0104212 | A1 | 4/2019 | Lee et al. | |
| 2019/0131701 | A1 | 5/2019 | Watanabe et al. | |
| 2020/0163204 | A1 | 5/2020 | Kim et al. | |
| 2020/0212584 | A1 | 7/2020 | Park et al. | |
| 2020/0243948 | A1 * | 7/2020 | Kim | H01Q 9/0414 |
| 2020/0403322 | A1 * | 12/2020 | Ryu | H01Q 21/08 |
| 2021/0126344 | A1 | 4/2021 | Jeon | |
| 2021/0159599 | A1 | 5/2021 | Park et al. | |

FOREIGN PATENT DOCUMENTS

| | | | |
|---|---|---|---|
| KR | 20190038264 | A | 4/2019 |
| KR | 20200057962 | A | 5/2020 |
| KR | 20200081760 | A | 7/2020 |
| KR | 20210063763 | A | 6/2021 |
| KR | 20210085392 | A | 7/2021 |
| KR | 20210111050 | A | 9/2021 |
| WO | 2019066235 | A1 | 4/2019 |
| WO | 2023043084 | A1 | 3/2023 |

OTHER PUBLICATIONS

International Search Report and Written Opinion for International Application No. PCT/KR2022/012866; International Filing Date Aug. 29, 2022; Date of Mailing Nov. 23, 2022; 66 Pages.

* cited by examiner

ANTENNA MODULE AND ELECTRONIC DEVICE INCLUDING THE SAME

CROSS-REFERENCE TO RELATED APPLICATIONS

This application is a continuation of International Application No. PCT/KR2022/012866 designating the United States, filed on Aug. 29, 2022, in the Korean Intellectual Property Receiving Office and claiming priority to Korean Patent Application No. 10-2021-0123049, filed on Sep. 15, 2021, in the Korean Intellectual Property Office, the disclosures of which are incorporated by reference herein in their entireties.

TECHNICAL FIELD

Various embodiments of the disclosure relate to antenna modules and electronic devices including the same.

BACKGROUND ART

The use of an electronic devices, such as smartphones, foldable phones, or tablet PCs is increasing, and various functions are provided to and/or by the electronic devices.

The electronic devices may transmit and receive a phone call and various data to and from another electronic devices through wireless communication.

The electronic devices may include at least one antenna module to perform wireless communication with another electronic device. For example, the electronic device may include at least one antenna module capable of supporting a high-frequency band (e.g., about 3 GHz to 300 GHz).

The electronic device may implement a wireless communication function corresponding to a $5^{th}$ generation (5G) communication band by using at least one antenna module.

DISCLOSURE

Technical Problem

The next-generation wireless communication technology may transmit and receive wireless signals by using a frequency band in the range of about 3 GHz to 300 GHz.

Recently, research on an antenna module capable of implementing the $5^{th}$ generation (5G) communication (e.g., millimeter wave (mmWave) communication), which is a kind of the next-generation wireless communication technology, has been actively conducted.

At least one antenna module may be disposed in an internal space of a housing of the electronic device. As functions capable of being provided an electronic device are diversified, the number of electronic components mounted in the electronic device is increasing.

As the number of electronic components mounted in the electronic device increases, there may be a limitation in an antenna module arrangement space.

Technical Solution

According to various embodiments, an electronic device is provided in which a plurality of antenna elements (e.g., conductive patches) are provided in antenna modules that are disposed in at least one slit (e.g., opening) provided in a side plate and/or a rear plate of the housing of the electronic device.

The technical problems to be addressed by this disclosure are not limited to those described above, and other technical problems, which are not described above, may be clearly understood by a person ordinarily skilled in the related art to which this disclosure belongs.

An electronic device according to various embodiments may include: a housing; a wireless communication module; a plurality of slits provided in the housing; and an antenna module disposed inside the housing to correspond to the plurality of slits and operatively connected to the wireless communication module, wherein the antenna module may include: a printed circuit board; a plurality of conductive patches disposed on a first surface of the printed circuit board; and a radio frequency integrated circuit (RFIC) disposed on a second surface of the printed circuit board, wherein the plurality of conductive patches are configured to be disposed in the plurality of slits.

An antenna module according to various embodiments may include: a printed circuit board; a plurality of conductive patches disposed on a first surface of the printed circuit board; and an RFIC disposed on a second surface of the printed circuit board, wherein the plurality of conductive patches may be configured to be disposed in a plurality of slits provided in at least a portion of a housing of an electronic device.

Advantageous Effects

According to various embodiments, because a plurality of antenna elements (e.g., conductive patches) provided in antenna modules are disposed in at least one slit (e.g., opening) provided in a side plate and/or a rear plate of a housing of an electronic device, it is possible to secure spaces for arranging different electronic components included in the electronic device.

In addition, various effects directly or indirectly identified through the disclosure may be provided.

DESCRIPTION OF DRAWINGS

In connection with the description of the drawings, the same or similar components may be denoted by the same or similar reference numerals.

MODE FOR INVENTION

Figure 1:
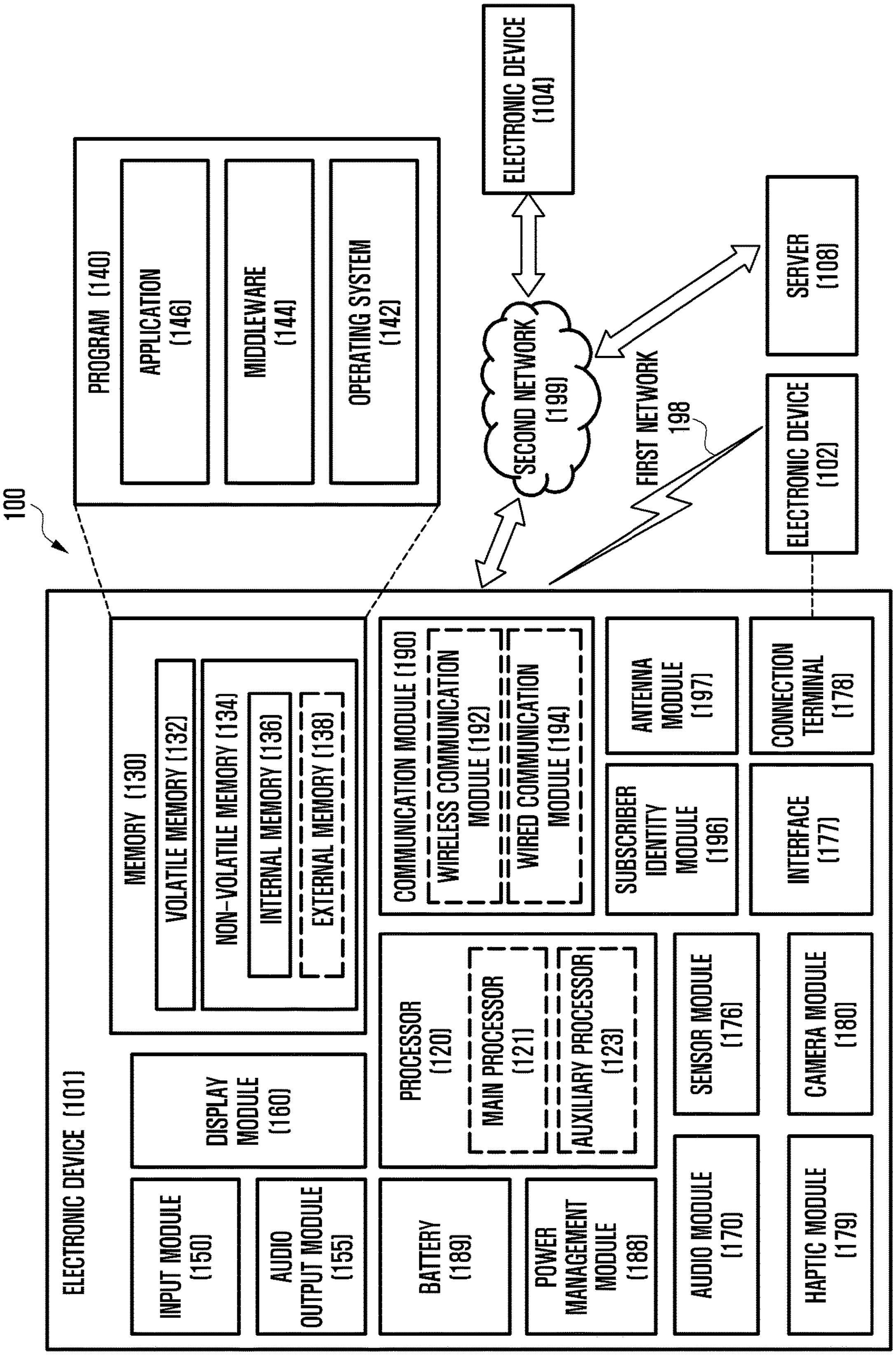
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2:
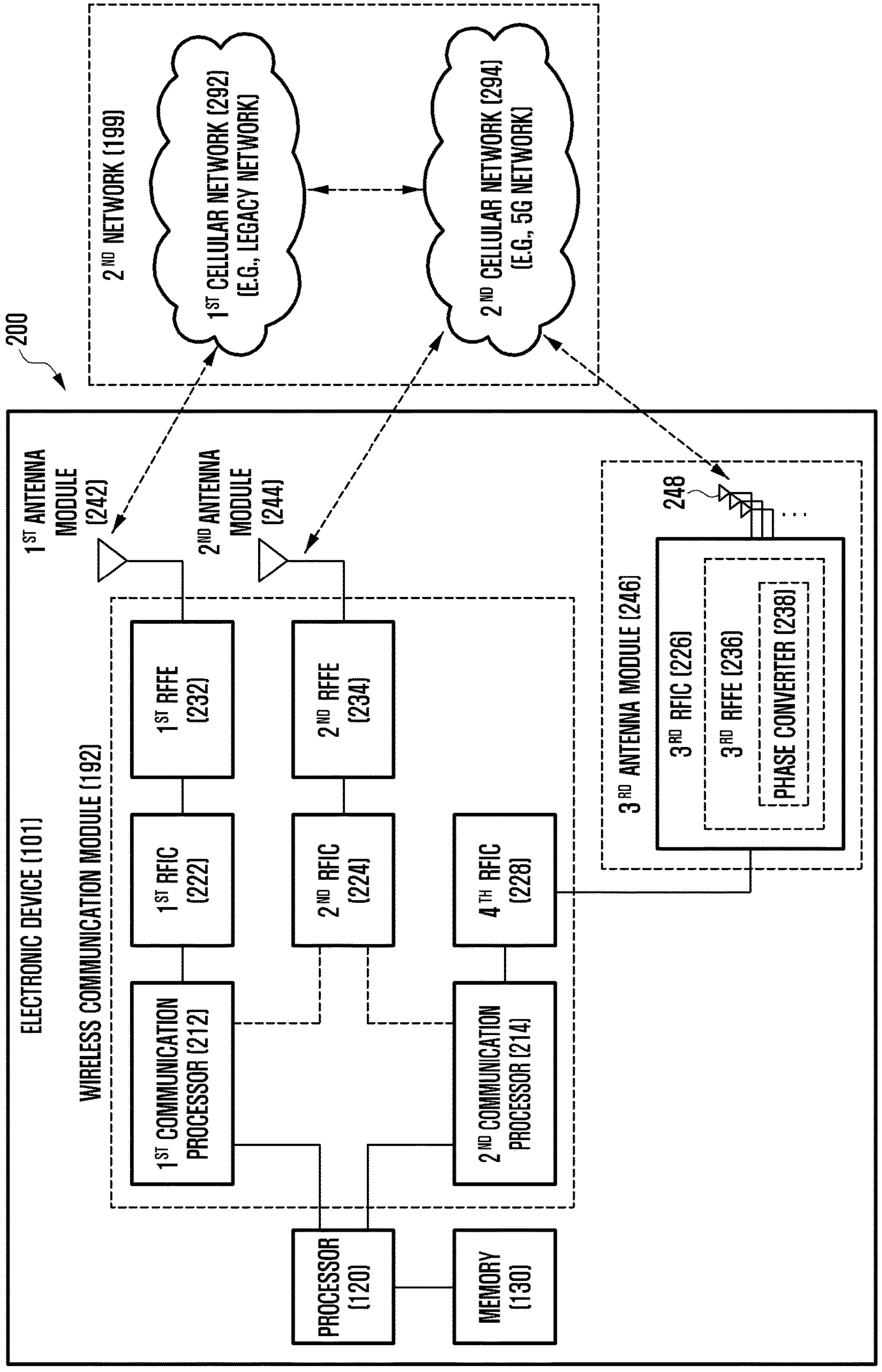
FIG. 2 is a block diagram of an electronic device configured to support legacy network communication and 5G network communication according to various embodiments.

FIG. 2 is a block diagram 200 of an electronic device 101 configured to support at least two different network communications. For example, the electronic device 101 may be configured to support a legacy network communication and a next-generation network (e.g., 5G network) communication, according to various embodiments.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and a third antenna module 246 having an antenna 248. The electronic device 101 may further include a processor 120 and a memory 130. A second network 199 (e.g., second network 199 shown in FIG. 1) may include a first cellular network 292 (e.g., a legacy network) and a second cellular network 294 (e.g., a 5G network). According to another embodiment, the electronic device 101 may include at least one or more of the components illustrated in FIG. 1, and the second network 199 may further include one or more other networks. According to an embodiment, the first communication processor 212, the second communication processor 214, the first RFIC 222, the second RFIC 224, the fourth RFIC 228, the first RFFE 232, and the second RFFE 234 may constitute at least a portion of a radio frequency (RF) communication module 192. According to another embodiment, the fourth RFIC 228 may be omitted, or may be included as a portion of the third RFIC 226.

The first communication processor 212 may establish a communication channel in a band to be used for RF communication with the first cellular network 292, and may support legacy network communication via the established communication channel. According to various embodiments, the first cellular network may be a legacy network including, without limitation, a $2^{nd}$ generation (2G), 3G, 4G, or long-term evolution (LTE) network. The second communication processor 214 may establish a communication channel corresponding to a predetermined band (e.g., about 6 GHz to about 60 GHz) in a band to be used for RF communication with the second cellular network 294, and may support 5G network communication via the established communication channel. According to various embodiments, the second cellular network 294 may be a 5G network defined in the Third Generation Partnership Project (3GPP). In addition, according to an embodiment, the first communication processor 212 or the second communication processor 214 may establish a communication channel corresponding to another predetermined band (e.g., about 6 GHz or lower) in the band to be used for RF communication with the second cellular network 294, and may support 5G network communication through the established communication channel. According to an embodiment, the first communication processor 212 and the second communication processor 214 may be implemented in a single chip or in a single package. According to various embodiments, the first communication processor 212 or the second communication processor 214 may be formed in a single chip or a single package with the processor 120, an auxiliary processor, and/or a communication module, such as shown and described with respect to FIG. 1.

During transmission or communication, the first RFIC 222 may convert a baseband signal generated by the first communication processor 212 into an RF signal of about 700 MHz to about 3 GHz to be used in the first cellular network 292 (e.g., a legacy network). During reception, an RF signal may be acquired from the first cellular network 292 (e.g., the legacy network) through an antenna (e.g., the first antenna module 242), and may be pre-processed through an RFFE (e.g., the first RFFE 232). The first RFIC 222 may convert the pre-processed RF signal from the first RFFE 232 into a baseband signal to be processed by the first communication processor 212.

Similarly, during transmission or communication, the second RFIC 224 may convert the baseband signal generated by the first communication processor 212 or the second communication processor 214 into an RF signal in a Sub6 band (e.g., about 6 GHz or lower) (hereinafter, referred to as "5G Sub6 RF signal") to be used in the second cellular network 294 (e.g., a 5G network). During reception, the 5G Sub6 RF signal may be acquired from the second cellular network 294 (e.g., a 5G network) through an antenna (e.g., the second antenna module 244), and may be pre-processed through an RFFE (e.g., the second RFFE 234). The second RFIC 224 may convert the pre-processed 5G Sub6 RF signal from the second RFFE 234 into a baseband signal that may be processed by a corresponding one of the first communication processor 212 and the second communication processor 214.

The third RFIC 226 may convert the baseband signal generated by the second communication processor 214 into an RF signal in a 5G Above6 band (e.g., about 6 GHz to about 60 GHz) (hereinafter, referred to as a "5G Above6 RF signal") to be used in the second cellular network 294 (e.g., a 5G network). During reception, the 5G Above6 RF signal may be acquired from the second cellular network 294 (e.g., a 5G network) through an antenna (e.g., the antenna 248 of the third antenna module 246), and may be pre-processed through the third RFFE 236. The third RFIC 226 may convert the pre-processed 5G Above6 RF signal from the third RFFE 236 into a baseband signal to be processed by the second communication processor 214. According to an embodiment, the third RFFE 236 may be provided as a portion of the third RFIC 226.

According to an embodiment, the electronic device 101 may include a fourth RFIC 228 separate from or as at least a portion of the third RFIC 226. In this case, the fourth RFIC 228 may convert the baseband signal generated by the second communication processor 214 into an RF signal (hereinafter, referred to as an "IF signal") in an intermediate-frequency band (e.g., about 9 GHz to about 11 GHz), and may then deliver the IF signal to the third RFIC 226. The third RFIC 226 may convert the IF signal into a 5G Above6 RF signal. During reception, the 5G Above6 RF signal may be received from the second network 294 (e.g., a 5G network) through an antenna (e.g., the antenna 248), and may be converted into an IF signal through the third RFIC 226. The fourth RFIC 228 may convert the IF signal into a baseband signal to be capable of being processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 and the second antenna module 244 may be omitted, or may be combined with another antenna module so as to process RF signals of multiple corresponding bands.

According to an embodiment, the third RFIC 226 and the antenna 248 may be disposed on the same substrate so as to form the third antenna module 246. For example, the RF communication module 192 or the processor 120 may be placed on a first substrate (e.g., a main PCB). In such a case, the third RFIC 226 may be disposed on a partial region (e.g., the top surface) of a second substrate (e.g., a sub-PCB) separate from the first substrate, and the antenna 248 may be disposed on another partial region (e.g., the bottom surface), thereby forming the third antenna module 246. By disposing the third RFIC 226 and the antenna 248 on the same substrate, it is possible to reduce the length of the transmission line therebetween. Through this, it is possible to reduce the loss (e.g., attenuation) of a signal in a high-frequency band (e.g., about 6 GHz to about 60 GHz) to be used for, for example, 5G network communication by the transmission line. As a result, the electronic device 101 is able to improve the quality or speed of communication with the second cellular network 294 (e.g., a 5G network).

According to an embodiment, the antenna 248 may be configured as an antenna array that includes multiple antenna elements capable of being used for beamforming. In such a configuration, the third RFIC 226 may include multiple phase converters 238 corresponding to the multiple antenna elements, for example, as a portion of the third RFFE 236. During transmission, each of the multiple phase converters 238 may convert the phase of a 5G Above6 RF signal to be transmitted to the outside of the electronic device 101 (e.g., a base station of a 5G network) through a corresponding antenna element. During reception, each of the multiple phase converters 238 may convert the phase of the 5G Above6 RF signal received from the outside into the same or substantially the same phase through the corresponding antenna element. This enables transmission or reception through beamforming between the electronic device 101 and the outside.

The second cellular network 294 (e.g., a 5G network) may be operated independently from the first cellular network 292 (e.g., a legacy network) (e.g., Stand-Alone (SA)), or may be operated in the state of being connected to the first cellular network 292 (e.g., Non-Stand-Alone (NSA)). For example, in a 5G network, only an access network (e.g., a 5G radio access network (RAN) or a next-generation RAN (NG RAN)) may exist, but a core network (e.g., a next-generation core (NGC)) may not exist. In this case, after accessing the access network of the 5G network, the electronic device 101 may access an external network (e.g., the Internet) under the control of the core network (e.g., an evolved packed core (EPC)) of a legacy network. Protocol information for communication with a legacy network (e.g., LTE protocol information) or protocol information for communication with a 5G network (e.g., new radio (NR) protocol information) may be stored in the memory 130, and may be accessed by another component (e.g., the processor 120, the first communication processor 212, or the second communication processor 214).

Figure 3A:
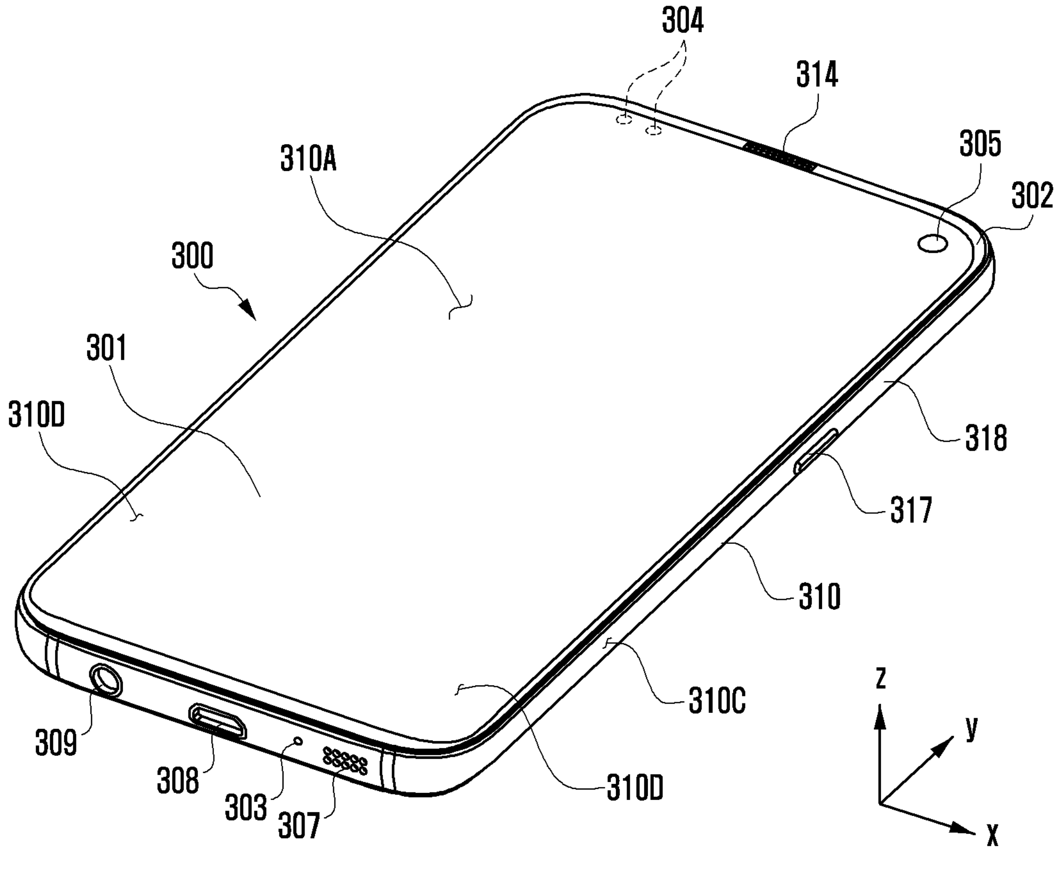
FIG. 3A is a front perspective view of an electronic device according to various embodiments.
Figure 3B:
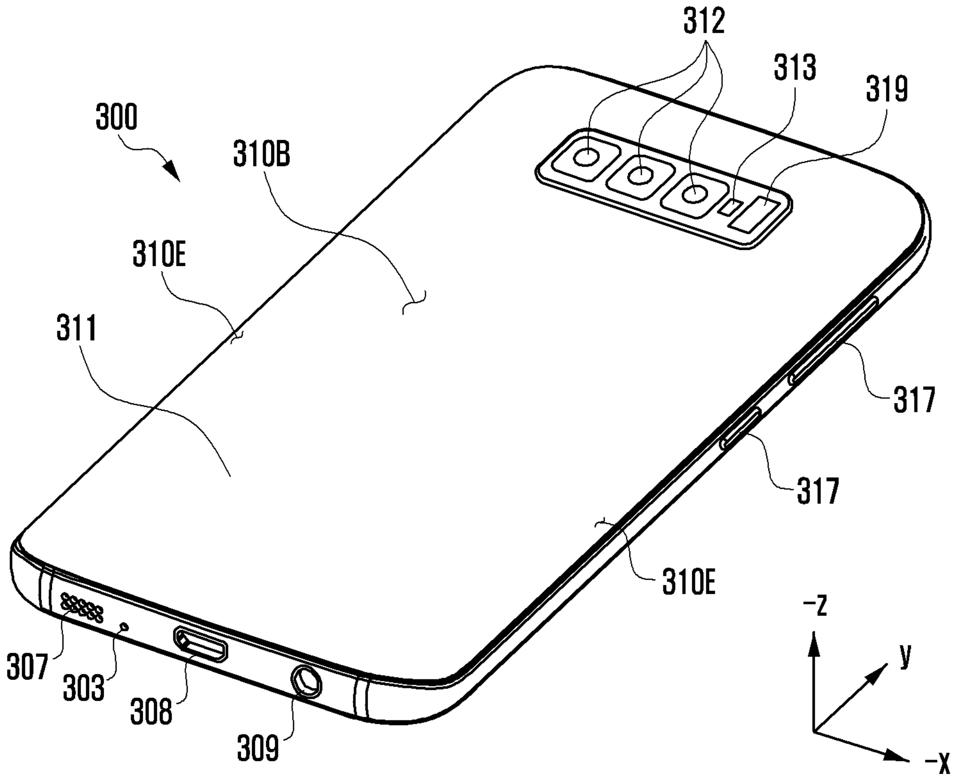
FIG. 3B is a rear perspective view of the electronic device of FIG. 3A

FIG. 3A is a front perspective view of an electronic device according to various embodiments. FIG. 3B is a rear perspective view of the electronic device of FIG. 3A, according to various embodiments.

Referring to FIG. 3A and FIG. 3B, an electronic device 300 according to an embodiment may include a housing 310 including a first surface (or front surface) 310A, a second surface (or rear surface) 310B, and a side surface 310C surrounding the space between the first surface 310A and the second surface 310B. In another embodiment (not illustrated), the housing may denote a structure that forms a part of the first surface 310A, the second surface 310B, and the side surface 310C illustrated in FIG. 3A and FIG. 3B. According to an embodiment, the first surface 310A may be formed by a front plate 302, at least a part of which is substantially transparent (for example, a glass plate including various coating layers, or a polymer plate). The second surface 310B may be formed by a rear plate 311 that is substantially opaque. The rear plate 311 may be made of coated or colored glass, ceramic, polymer, metal (for example, aluminum, stainless steel (STS), or magnesium), or a combination of at least two of the above-mentioned materials. The side surface 310C may be formed by a side bezel structure (or "side member") 318 which is coupled to the front plate 302 and to the rear plate 311, and which includes metal and/or polymer. In some embodiments, the rear plate 311 and the side bezel structure 318 may be formed integrally and may include the same material (for example, a metal material such as aluminum).

In the illustrated embodiment, the front plate 302 may include two first areas 310D on both ends of the long edge of the front plate 302 such that the two first areas 310D bend from the first surface 310A toward the rear plate 311 and extend seamlessly. In the illustrated embodiment (see FIG. 3B), the rear plate 311 may include two second areas 310E on both ends of the long edge such that the two second areas 310E bend from the second surface 310B toward the front plate 302 and extend seamlessly. In some embodiments, the front plate 302 (or the rear plate 311) may include only one of the first areas 310D (or the second areas 310E). In another embodiment, a part of the first areas 310D or the second areas 310E may not be included. In the above embodiments, when seen from the side surface of the electronic device 300, the side bezel structure 318 may have a first thickness (or width) on a part of the side surface, which does not include the first areas 310D or the second areas 310E as described above, and may have a second thickness that is smaller than the first thickness on a part of the side surface, which includes the first areas 310D or the second areas 310E.

According to an embodiment, the electronic device 300 may include at least one of a display 301, audio modules 303, 307, and 314, sensor modules 304 and 319, camera modules 305, 312, and 313, a key input device 317, indicator and connector holes 308 and 309. In some embodiments, at least one of the constituent elements (for example, the key input device 317 or indicator) of the electronic device 300 may be omitted, or the electronic device 300 may additionally include another constituent element.

The display 301 may be exposed through a corresponding part of the front plate 302, for example. In some embodiments, at least a part of the display 301 may be exposed through the front plate 302 that forms the first areas 310D of the side surface 310C and the first surface 310A. In some embodiments, the display 301 may have a corner formed in substantially the same shape as that of the adjacent outer periphery of the front plate 302. In another embodiment (not illustrated), in order to increase the area of exposure of the display 301, the interval between the outer periphery of the display 301 and the outer periphery of the front plate 302 may be formed to be substantially identical.

The audio modules may include a microphone hole 303 and speaker holes 307 and 314. A microphone for acquiring an external sound may be arranged in the microphone hole 303, and a plurality of microphones may be arranged therein such that the direction of a sound can be sensed in some embodiments. The speaker holes 307 and 314 may include an outer speaker hole 307 and a speech receiver hole 314. In some embodiments, the speaker holes 307 and 314 and the microphone hole 303 may be implemented as a single hole, or a speaker may be included (for example, a piezoelectric speaker) without the speaker holes 307 and 314.

The sensor modules 304 and 319 may generate an electric signal or a data value corresponding to the internal operating condition of the electronic device 300 or the external environment condition thereof. The sensor modules 304 and 319 may include, for example, a first sensor module 304 (for example, a proximity sensor) arranged on the first surface 310A of the housing 310, and/or a second sensor module (not illustrated) (for example, a fingerprint sensor), and/or a third sensor module 319 (for example, an HRM sensor) arranged on the second surface 310B of the housing 310, and/or a fourth sensor module 316 (for example, a fingerprint sensor). The fingerprint sensor may be arranged not only on the first surface 310A (for example, the display 301) of the housing 310, but also on the second surface 310B thereof. The electronic device 300 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 304.

The camera modules 305, 312, and 313 may include a first camera device 305 arranged on the first surface 310A of the electronic device 300, a second camera device 312 arranged on the second surface 310B thereof, and/or a flash 313. The camera devices 305 and 312 may include a single lens or a plurality of lenses, an image sensor, and/or an image signal processor. The flash 313 may include, for example, a light-emitting diode or a xenon lamp. In some embodiments, two or more lenses (an infrared camera, a wide-angle lens, and a telephoto lens) and image sensors may be arranged on a single surface of the electronic device 300.

The key input device 317 may be arranged on the side surface 310C of the housing 310. In another embodiment, the electronic device 300 may not include a part of the above-mentioned key input device 317 or the entire key input device 317, and the key input device 317 (not included) may be implemented in another type, such as a soft key, on the display 301. In some embodiments, the key input device may include a sensor module 316 arranged on the second surface 310B of the housing 310.

The indicator may be arranged on the first surface 310A of the housing 310, for example. The indicator may provide information regarding the condition of the electronic device 300 in a light type, for example. In another embodiment, the indicator may provide a light source that interworks with operation of the camera module 305, for example. The indicator may include, for example, an LED, an IR LED, and a xenon lamp.

The connector holes 308 and 309 may include a first connector hole 308 capable of containing a connector (for example, a USB connector) for transmitting/receiving power and/or data to/from an external electronic device, and/or a second connector hole (for example, an earphone jack) 309 capable of containing a connector for transmitting/receiving an audio signal to/from the external electronic device.

Figure 3C:
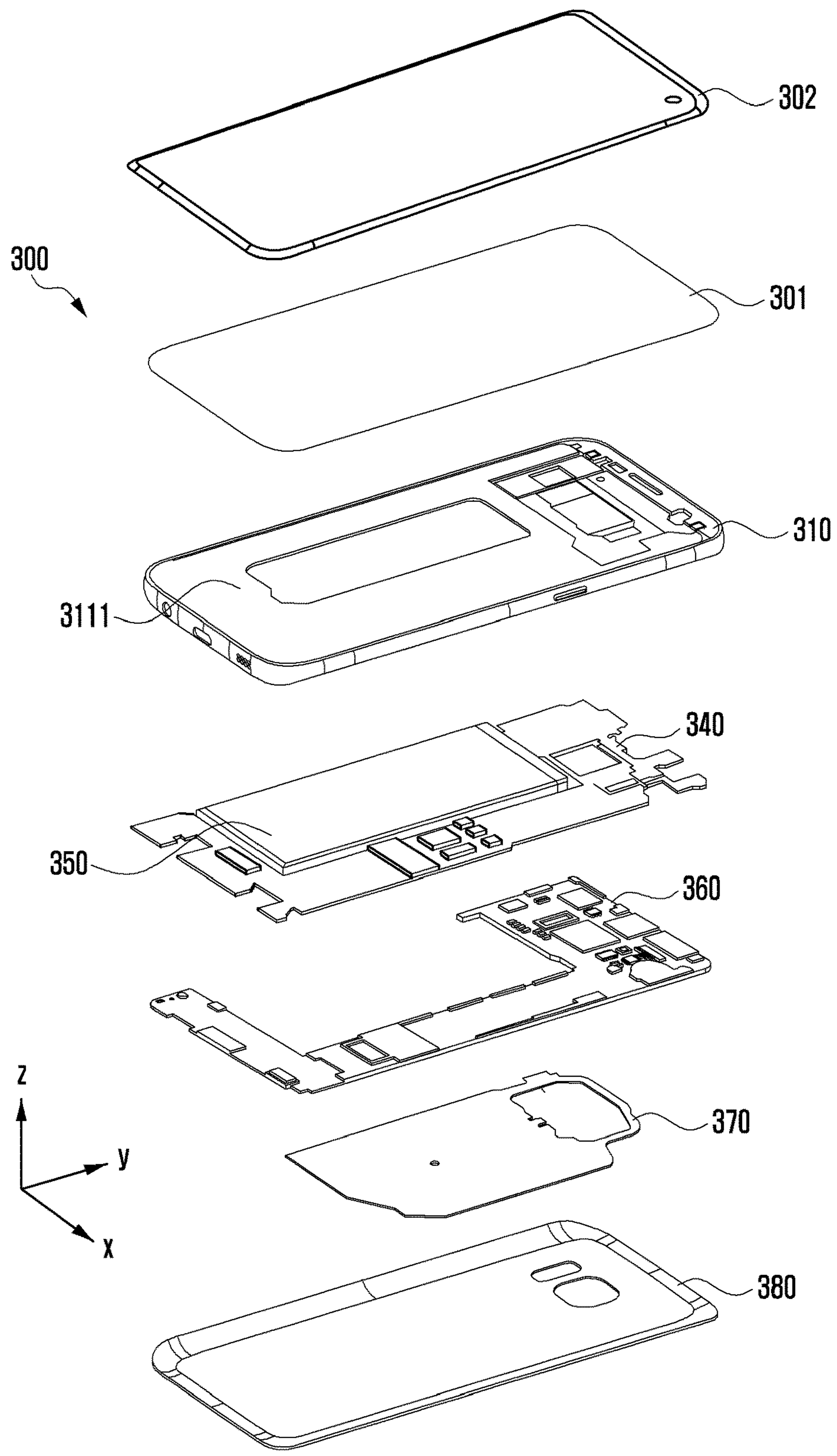
FIG. 3C is an exploded perspective view of the electronic device of FIG. 3A.

FIG. 3C is an exploded perspective view of the electronic device of FIG. 3A, according to various embodiments.

Referring to FIG. 3C, the electronic device 300 may include a side bezel structure 310, a first support member 3111 (for example, a bracket), a front plate 302, a display 301, a printed circuit board 340, a battery 350, a second support member 360 (for example, a rear case), an antenna 370, and a rear plate 380. In some embodiments, at least one of the constituent elements (for example, the first support member 3111 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIG. 1 and FIG. 2, and repeated descriptions thereof will be omitted herein.

The first support member 3111 may be arranged inside the electronic device 300 and connected to the housing 310, or may be formed integrally with the housing 310. The first support member 3111 may be made of a metal material and/or a nonmetal (for example, polymer) material, for example. The display 301 may be coupled to one surface of the first support member 3111, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 3111.

FIGS. 4A-4D are views illustrating an embodiment of, for example, a structure of a third antenna module 246 (e.g., as described with reference to FIG. 2).

Figure 4A:
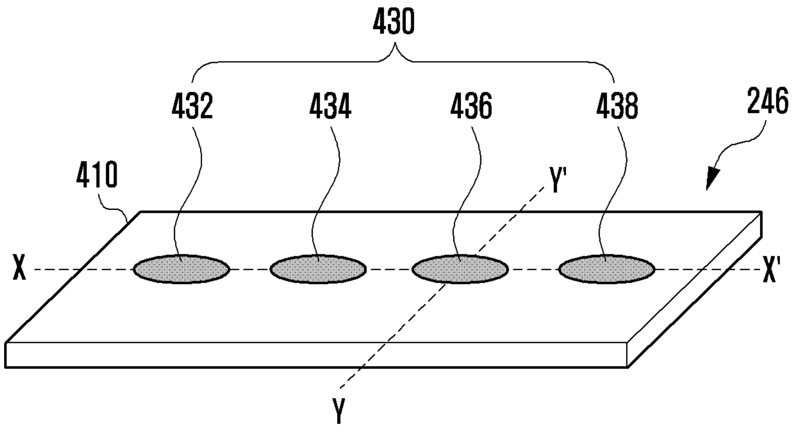
FIG. 4A is a view illustrating a first side of an embodiment of a structure of an antenna module, according to various embodiments.
Figure 4B:
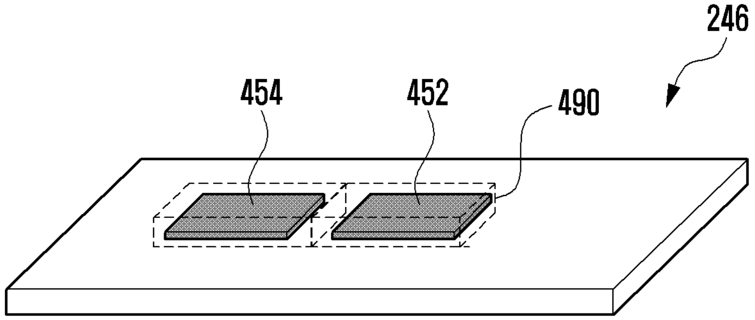
FIG. 4B is a view illustrating a second, opposite side, of the antenna module of FIG. 4A.
Figure 4C:
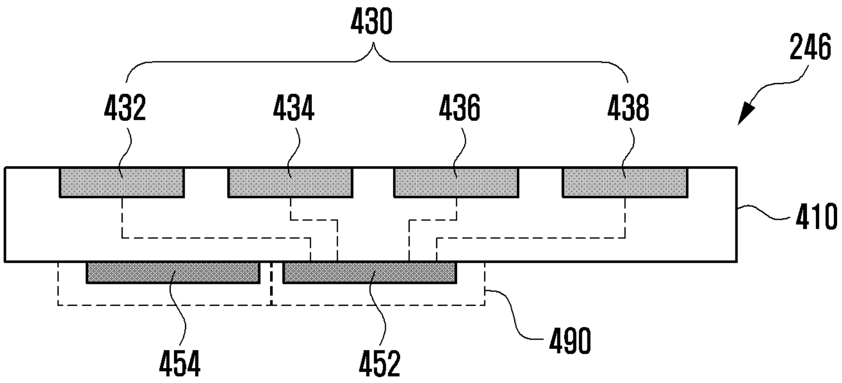
FIG. 4C is a cross-sectional view of the antenna module of FIG. 4A, taken along the line X-X' of FIG. 4A.
Figure 4D:
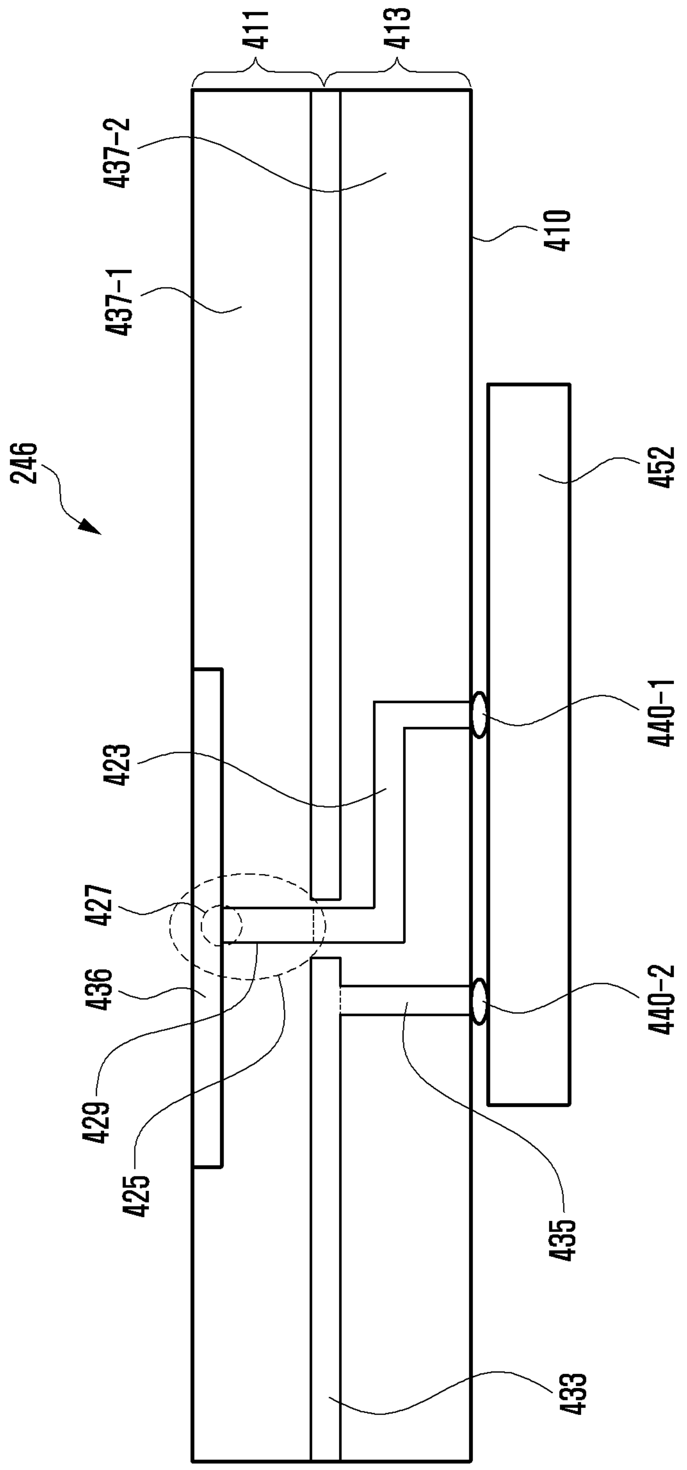
FIG. 4D is a cross-sectional view taken along line Y-Y' of the third antenna module illustrated in view (a) of FIG. 4A, according to various embodiments.

FIG. 4A is a perspective view of the third antenna module 246 viewed from one side, FIG. 4B is a perspective view of the third antenna module 246 viewed from the other side, FIG. 4C is a cross-sectional view taken along line X-X' of the third antenna module 246, and FIG. 4D is a cross-sectional view taken along the line Y-Y' of the third antenna module 426.

Referring to FIGS. 4A-4D, in an embodiment and as shown, the third antenna module 246 may include a printed circuit board 410, an antenna array 430, a radio frequency integrated circuit (RFIC) 452, and a power manage integrated circuit (PMIC) 454. Optionally, as shown in FIG. 4B, the third antenna module 246 may further include a shield member 490. In other embodiments, at least one of the above-mentioned components may be omitted, or at least two of the components may be integrally formed.

The printed circuit board 410 may include multiple conductive layers and multiple non-conductive layers stacked alternately with the conductive layers. The printed circuit board 410 may provide an electrical connection between various electronic components mounted on the printed circuit board 410 and/or various electronic components disposed outside the printed circuit board using wiring lines and conductive vias provided in the conductive layers.

The antenna array 430 (e.g., the antenna 248 in FIG. 2) may include a plurality of antenna elements 432, 434, 436, 438 (e.g., conductive patches) disposed to form directional beams. As illustrated, the antenna elements 432, 434, 436, 438 may be provided on a first surface of the printed circuit board 410. According to another embodiment, the antenna array 430 may be provided inside the printed circuit board 410. According to embodiments, the antenna array 430 may include multiple antenna arrays, which are different or the same in shape and/or type (e.g., dipole antenna arrays and/or patch antenna arrays). Although FIG. 4A illustrates four antenna elements 432, 434, 436, 438, those of skill in the art will appreciate that a lesser number or greater number of antenna elements may be employed without departing from the scope of the present disclosure.

The RFIC 452 (e.g., the third RFIC 226 in FIG. 2) may be disposed in another region (e.g., on a second surface opposite to the first surface) of the printed circuit board 410 spaced apart from the antenna array 430. The RFIC 452 may be configured to be capable of processing signals in one or more selected frequency bands transmitted/received through the antenna array 430. According to an embodiment, during transmission, the RFIC 452 may convert a baseband signal acquired from a communication processor (not illustrated) into an RF signal in one or more predetermined bands. During reception, the RFIC 452 may convert an RF signal received through the antenna array 430 into a baseband signal and transmit the baseband signal to a communication processor.

According to another embodiment, during transmission, the RFIC 452 may up-convert an IF signal (e.g., about 9 GHz to about 11 GHz) acquired from an intermediate frequency integrated circuit (IFIC) (e.g., the fourth RFIC 228 in FIG. 2) into an RF signal of a selected band. During reception, the RFIC 452 may down-convert an RF signal acquired through the antenna array 430 into an IF signal and transmit the IF signal to the IFIC.

The PMIC 454 may be arranged in another partial region (e.g., on the second surface) of the printed circuit board 410 spaced apart from the antenna array 430. The PMIC 454 may receive a voltage from a main PCB (not illustrated) and may provide required power for various components (e.g., the RFIC 452) on the antenna module 246.

The shield member 490 may be disposed on a portion (e.g., the second surface) of the printed circuit board 410 so as to electromagnetically shield at least one of the RFIC 452 or the PMIC 454. According to an embodiment, the shield member 490 may include a shield can.

Although not illustrated, in various embodiments, the third antenna module 246 may be electrically connected to another printed circuit board (e.g., a main circuit board) via a module interface. The module interface may include a connecting member, such as a coaxial cable connector, a board-to-board connector, an interposer, or a flexible printed circuit board (FPCB). Through the connection member, the RFIC 452 and/or the PMIC 454 of the antenna module may be electrically connected to the printed circuit board.

FIG. 4D is a cross-sectional view taken along line Y-Y' of the third antenna module illustrated in FIG. 4A. The printed circuit board 410 of the illustrated embodiment may include an antenna layer 411 and a network layer 413.

Referring to FIG. 4D, the antenna layer 411 may include at least one dielectric layer 437-1 as well as an antenna element 436 (e.g., a conductive patch) and/or a feed portion 425 provided on the outer surface of the dielectric layer 437-1 or inside the dielectric layer 437-1. The feed portion 425 may include a power feeding point 427 and/or a power feeding line 429 (e.g., a signal line).

The network layer 413 may include at least one dielectric layer 437-2, at least one ground layer 433 provided on the outer surface of the dielectric layer 437-2 or inside the dielectric layer 437-2, at least one conductive via 435, and/or a signal line 423.

In the illustrated embodiment, the third RFIC 452 illustrated in FIGS. 4B-4D (e.g., the third RFIC 226 in FIG. 2) may be electrically connected to the network layer 413 via, for example, first and second connection portions (e.g., solder bumps) 440-1, 440-2. In other embodiments, various connection structures (e.g., solder or BGA) may be used instead of the connection portions 440-1, 440-2. The third RFIC 452 may be electrically connected to the antenna element 436 via the first connection portion 440-1, the transmission line 423, and the feed portion 425 (e.g., a feed line 429 and a feed point 427). The third RFIC 452 may be electrically connected to the ground layer 433 via the second connection portion 440-2 and the conductive via 435.

Figure 5A:
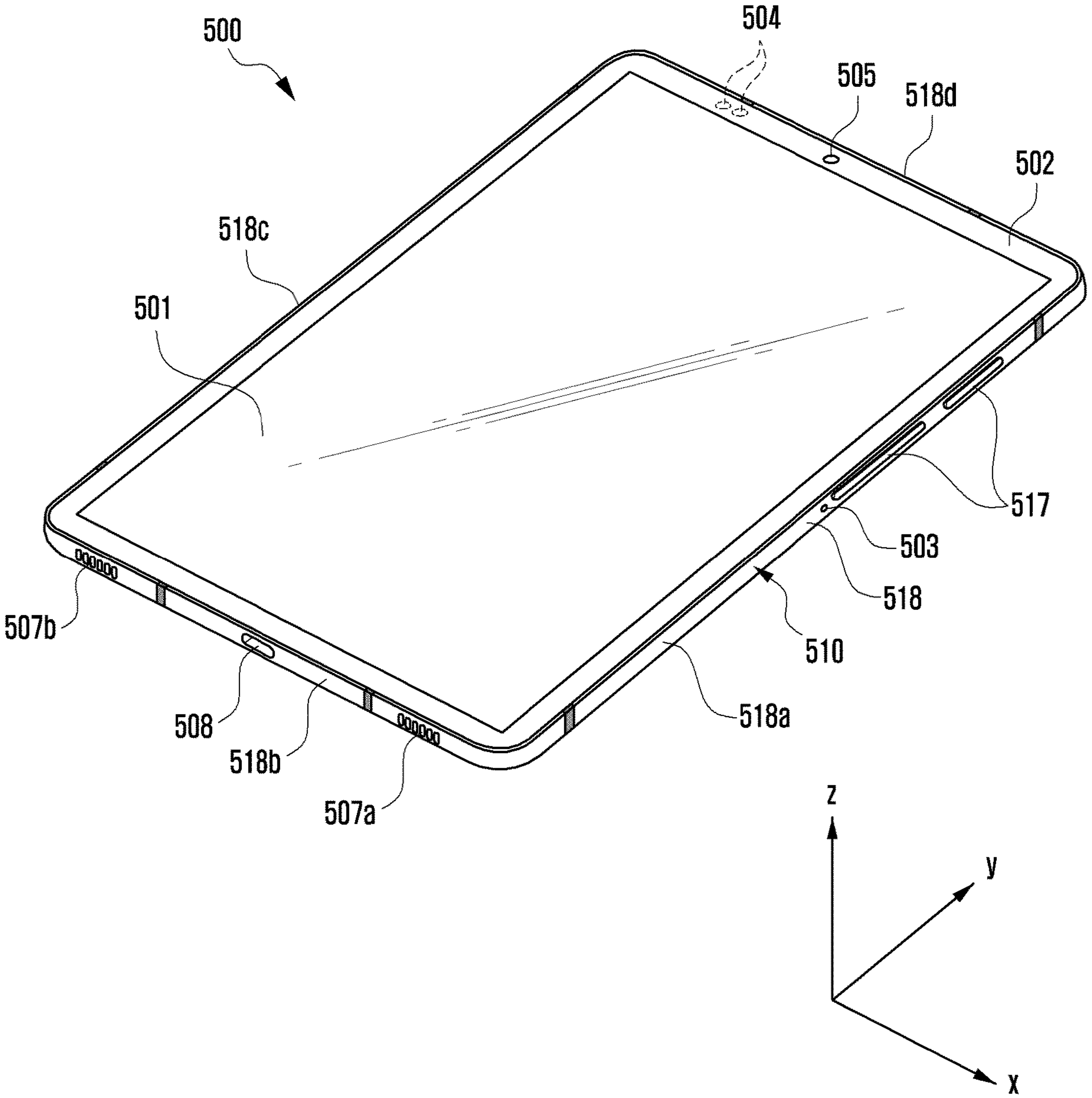
FIG. 5A is a front perspective view of an electronic device according to various embodiments.
Figure 5B:
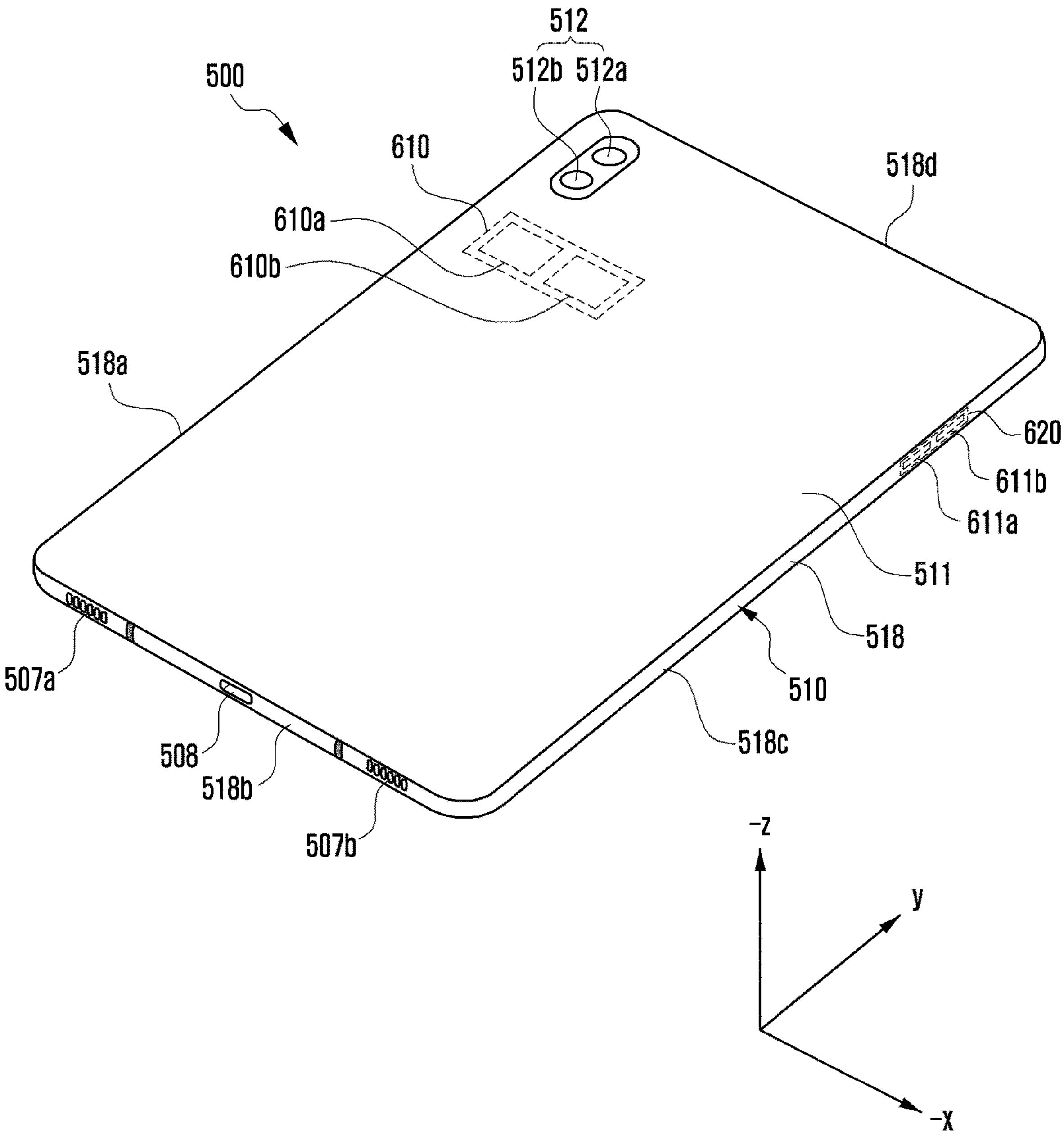
FIG. 5B is a rear perspective view of the electronic device of FIG. 5A.

FIG. 5A is a front perspective view of an electronic device according to various embodiments. FIG. 5B is a perspective view illustrating the rear side of the electronic device of FIG. 5A, according to various embodiments.

According to an embodiment, the electronic device 500 illustrated in FIGS. 5A and 5B according to various embodiments may be arranged as a tablet PC, although the electronic device 500 may be representative of other types of electronic devices. The electronic device 500 (e.g., a tablet PC) illustrated in FIGS. 5A and 5B may include features and components as shown and described with respect to FIGS. 1-4D. The electronic device 500 illustrated in FIGS. 5A and 5B may be configured similar to the electronic device 101 illustrated in FIGS. 1 and 2 and/or the electronic device 300 illustrated in FIGS. 3A to 3C.

Referring to FIGS. 5A and 5B, the electronic device 500 according to various embodiments may include a housing 510 including a front plate 502 (e.g., the front plate 302 in FIG. 3C) that is oriented in a first direction (e.g., the +z-axis direction), a rear plate 511 (e.g., the rear plate 380 in FIG. 3C) oriented in a second direction (e.g., the −z axis direction) opposite to the first direction, and a side member 518 (e.g., the side surface 310*c* in FIG. 3A) surrounding an internal space between the front plate 502 and the rear plate 511.

According to an embodiment, the side member 518 may include: a first side surface 518*a* having a first length; a second side surface 518*b* extending from the first side surface 518*a* in a direction substantially perpendicular to the first side surface 518*a* and having a second length shorter than the first length; a third side surface 518*c* extending from the second side surface 518*b* substantially parallel to the first side surface 518*a* and having the first length; and a fourth side surface 518*d* extending substantially parallel to the second side surface 518*b* and having the second length.

According to an embodiment, the front plate 502 may be made of a glass plate or a polymer plate including various coating layers.

According to an embodiment, the rear plate 511 may be made of, for example, coated or colored glass, ceramic, polymer, metal (e.g., aluminum, stainless steel (STS), or magnesium), or a combination of two or more of these materials. The rear plate 511 may be made of, for example, a metal material and/or a non-metal (e.g., a polymer) material.

According to various embodiments, the rear plate 511 may be provided with at least one slit at a predetermined position. The slits, as described herein, are openings or gaps in the material of the respective housing to provide a path for wireless communication to pass from an interior of the electronic device to an exterior of the electronic device (or vice versa). The slits provide a position for small, discrete antenna elements to be arranged proximate an exterior opening in the electronic device. Accordingly, the antenna elements may be positioned within the housing and occupying minimal space, thus permitting other components to be installed and/or to reduce the total size of the electronic device. In some embodiments, the slits may be filled with a polymer or other non-conductive material to prevent external debris from entering the electronic device but permitting the wireless communication using the antenna elements, as described herein.

In an embodiment, the rear plate 511 may be provided with a plurality of slits (e.g., a first slit 610*a* and a second slit 610*b*) at predetermined positions (e.g., as shown in FIG. 5B). For example, the plurality of slits (e.g., the first slit 610*a* and the second slit 610*b*) may be provided in the rear plate 511 and may include a company logo and/or a product name of the electronic device 500. The plurality of slits 610*a*, 610*b* may include an opening provided through the rear plate 511. The plurality of slits 610*a*, 610*b* may be filled with a non-conductive injection-molded article (e.g., a polymer). In another embodiment, the rear plate 511 may include at least one slit (e.g., a first slit 610*a* and/or a second slit 610*b*) provided at a predetermined position.

According to various embodiments, on the inner side (e.g., in the +z-axis direction) of the rear plate 511 in which the plurality of slits (e.g., the first slit 610*a* and the second slit 610*b*) are provided, a first antenna module 610 (e.g., the third antenna module 246 in FIGS. 4A-4D) may be disposed. The first antenna module 610 may at least partially overlap the plurality of slits (e.g., the first slit 610*a* and the second slit 610*b*), and may be disposed on the inner side of the rear plate 511 (e.g., in the +z-axis direction). That is, the first antenna module 610 may be disposed within the internal space of the electronic device 500

According to an embodiment, the side member 518 may be coupled to the front plate 502 and the rear plate 511 and may configured in a side bezel structure including a metal and/or a polymer. In some embodiments, the rear plate 511 and the side member 518 may be configured integrally, and may include the same material (e.g., a metal material such as aluminum or magnesium).

According to various embodiments, the side member 518 (e.g., the housing 510) may be provided with a plurality of slits (e.g., the first slit 611*a* and the second slit 611*b*) at predetermined positions. For example, the plurality of slits 611*a*, 611*b* provided in the side member 518 may include a company logo and/or a product name of the electronic device 500. The plurality of slits 611*a*, 611*b* may include an opening provided through the side member 518. The plurality of slits 611*a*, 611*b* may be filled with a non-conductive injection-molded article (e.g., a polymer). In another embodiment, the side member 518 may include at least one slit (e.g., a first slit 611*a* and/or a second slit 611*b*) provided at a predetermined position.

According to various embodiments, on the inner side (e.g., in the +x-axis direction) of the side member 518 in which the plurality of slits (e.g., the first slit 611*a* and the second slit 611*b*) are provided, a second antenna module 620 (e.g., the third antenna module 246 in FIG. 4A) may be disposed. The second antenna module 620 may at least partially overlap the plurality of slits 611*a*, 611*b*, and may be disposed on the inner side of the side member 518 (e.g., in the +x-axis direction).

According to various embodiments, the first antenna module 610 disposed on the inner side of the rear plate 511 and the second antenna module 620 disposed on the inner side of the side member 518 may be electrically connected to the wireless communication module 192 or the processor 120 of the electronic device 101 illustrated in FIG. 1 or FIG. 2. The first antenna module 610 and/or the second antenna module 620 may perform, for example, 5th generation (5G) communication (e.g., millimeter wave (mmWave) communication) that is capable of using a frequency band in the range of about 3 GHz to 300 GHz.

According to an embodiment, the electronic device 500 may include one or more of a display 501 (e.g., the display module 160 in FIG. 1), at least one input module 503 (e.g., the input module 150 in FIG. 1), at least one speaker hole 507*a* and/or 507*b*, a sensor module 504 (e.g., the sensor module 176 in FIG. 1), camera modules 505 and 512 (512*a*, 512*b*) (e.g., the camera module 180 in FIG. 1), a key input device 517, and a connector hole 508. In some embodiments, at least one of the above-mentioned components may be omitted from the electronic device 500 or other components may be additionally included in the electronic device 500.

According to various embodiments, the display 501 may be exposed through a substantial portion of, for example, the front plate 502. The display 501 may be exposed through substantially the entire region of the front plate 502. The edges of the display 501 may be configured to be substantially the same as the shape of the periphery of the front plate 502 adjacent thereto. In another embodiment (not illustrated), the distance between the periphery of the display 501 and the periphery of the front plate 502 may be substantially constant in order to increase the exposed area of the display 501. In another embodiment (not illustrated), a recess or opening may be provided in a portion of the screen display region of the display 501, and at least one of the above-described components may be disposed to be aligned with the recess or opening.

According to various embodiments, the electronic device 500 may include, on the rear surface of the screen display region of the display 501, an audio module (e.g., the audio module 170 in FIG. 1), a sensor module 504, a camera module 505, or a light-emitting element (not illustrated).

According to an embodiment, the display 501 may be coupled to or disposed adjacent to a touch-sensing circuit, a pressure sensor capable of measuring the intensity (pressure) of a touch, and/or a digitizer that detects an electromagnetic-field-type electronic pen (a stylus pen).

According to various embodiments, the input module 503 may include at least one microphone. In some embodiments, the input module 503 may include a plurality of microphones disposed at different positions to detect the direction of sound.

According to various embodiments, the at least one speaker hole 507*a* and/or 507*b* may output sound through a speaker module (not illustrated) disposed inside the electronic device 500.

According to various embodiments, the sensor module 504 may generate an electrical signal or a data value corresponding to an internal operating state of the electronic device 500 or an external environmental state. The sensor module 504 may include at least one of, for example, a proximity sensor, a fingerprint sensor, a heart rate monitor (HRM) sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, the camera modules 505 and 512 (512*a* and 512*b*) may include a front camera module 505 disposed to be exposed to the outside through the front plate 502 and rear camera modules 512*a* and 512*b* disposed to be exposed to the outside through the rear plate 511. According to an embodiment, the camera modules 505, 512*a*, 512*b* may include one or more lenses, image sensors, and/or image signal processors. According to an embodiment, at least two rear camera modules 512*a* and 512*b* may be disposed adjacent to each other as one camera module assembly 512. For example, the pair of camera modules 512*a* and 512*b* of the camera module assembly 512 may implement a dual camera function for general imaging, wide-angle imaging, or ultra-wide-angle imaging.

According to various embodiments, in the electronic device 500, a camera module (e.g., the front camera module 505) may be disposed on the rear surface (e.g., the surface oriented in the −z-axis direction) of the display 501 to be oriented in the +z-axis direction. For example, the front camera module 505 may not be visually exposed and may include a hidden under display camera (UDC).

According to various embodiments, the key input device 517 may be disposed through the side member 518 of the housing 510. The key input devices 517 may be buttons, switches, toggles, or other types of mechanical or electrical input elements, as will be appreciated by those of skill in the art. In another embodiment, the electronic device 500 may not include some or all of the above-mentioned key input devices 517, and a key input device 517, which is not included in the above mentioned key input devices, may be implemented on the display 501 in the form of a soft key. According to various embodiments, the key input device 517 may be implemented using a pressure sensor included in the display 501. The key input device 517 may include at least one pressure-responsive key that is disposed inside the electronic device 500 and uses a strain gauge that measures a pressure change due to the pressing of the side member 518.

According to various embodiments, the connector hole 508 may include a connector (e.g., a USB connector or an IF connector) for transmitting/receiving power, audio signals, and/or data to and from an external electronic device (e.g., the external electronic devices 102 and 104 in FIG. 1). That is, in some configurations, the connector hole 508 may be a port or the like configured to receive a plug or connector element associated with another device (e.g., USB data transfer cable) and/or power supply (e.g., charging cable).

Figure 6:
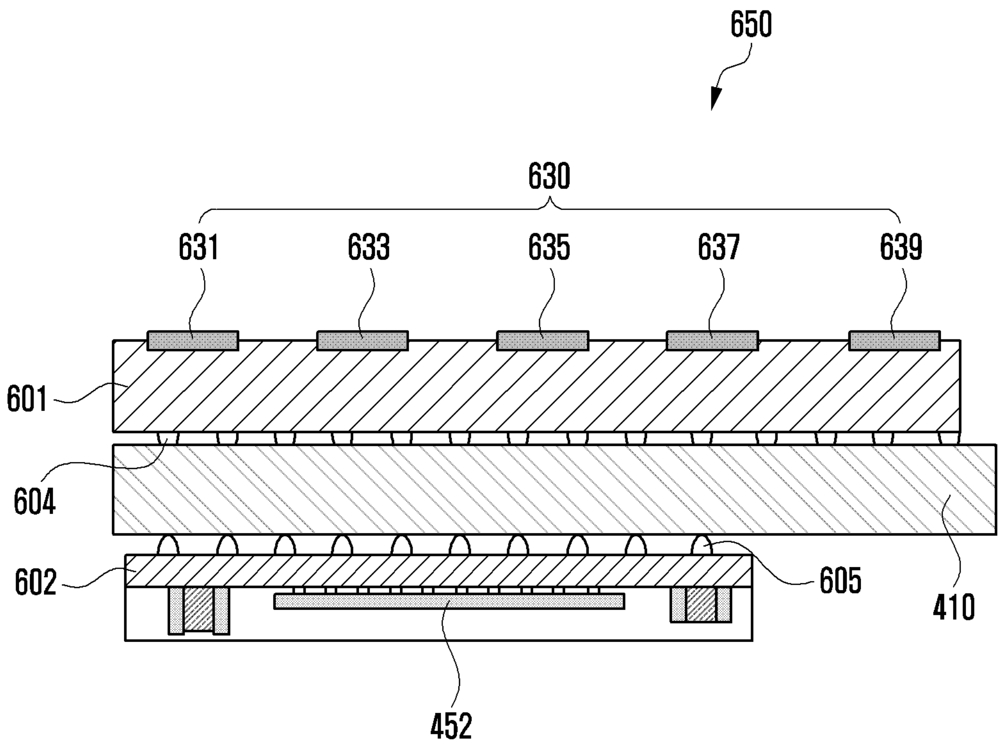
FIG. 6 is a view schematically illustrating the configuration of an antenna module included in an electronic device according to various embodiments.

FIG. 6 is a view schematically illustrating a configuration of an antenna module 650 included in an electronic device according to various embodiments.

According to various embodiments, the antenna module 650 of FIG. 6 may be configured as one of the first antenna module 610 and the second antenna module 620 illustrated in FIG. 5B or the third antenna module 246 illustrated in FIG. 4A. The antenna module 650 of FIG. 6 may incorporate features and elements of the embodiments illustrated in the third antenna module 246 illustrated in FIG. 4A.

Referring to FIG. 6, the antenna module 650, according to various embodiments, may include a printed circuit board 410, an antenna array 630, and a radio frequency integrated circuit (RFIC) 452.

According to an embodiment, the printed circuit board 410 (e.g., the printed circuit board 410 in FIG. 4A) may include a plurality of conductive layers and a plurality of non-conductive layers alternately stacked with the conductive layers. The printed circuit board 410 may provide an electrical connection between various electronic components mounted on the printed circuit board 410 and/or various electronic components disposed outside the printed circuit board 410 by using wiring lines and conductive vias provided in the conductive layers.

According to an embodiment, the antenna array 630 (e.g., the antenna array 430 in FIG. 4A) may include a plurality of antenna elements 631, 633, 635, 637, 639 (e.g., conductive patches) disposed to form a directional beam. The antenna elements 631, 633, 635, 637, 639 may be provided on a first surface (e.g., the top surface) of the printed circuit board 410. According to another embodiment, the antenna array 630 may be provided on the printed circuit board 410. Although shown with five antenna elements 631, 633, 635, 637, 639, those of skill in the art will appreciate that a greater or lesser number of antenna elements may be implemented without departing from the scope of the present disclosure.

According to an embodiment, the antenna module 650 may include a first board 601 that is configured integrally with the printed circuit board 410 and a second board 602, with the first board 601 and the second board 602 disposed on opposite sides of the printed circuit board 410.

According to various embodiments, the plurality of antenna elements 631, 633, 635, 637, 639 of the antenna array 630 may include, for example, a first conductive patch 631, a second conductive patch 633, a third conductive patch 635, a fourth conductive patch 637, and/or a fifth conductive patch 639. The antenna array 630 is not limited to the above-described first to fifth conductive patches 631, 633, 635, 637, 639, and may include fewer or more conductive patches. The antenna array 630 may include a plurality of antenna arrays having the same shape or different shapes and/or of different types (e.g., a dipole antenna array and/or a patch antenna array).

According to various embodiments, the antenna array 630 (e.g., the first conductive patch 631, the second conductive patch 633, the third conductive patch 635, the fourth conductive patch 637, and/or the fifth conductive patch 639) may be disposed on a top surface (e.g., the first surface) the first board 601 (e.g., a dielectric body) and/or inside the first board 601, and may be electrically connected to the printed circuit board 410 by using at least one connective connection member 604 (e.g., solder) provided on a bottom surface (e.g., the second surface) of the first board 601. According to an embodiment, the RFIC 452 (e.g., the RFIC 452 in FIG. 4A) may be disposed on a second surface (e.g., the bottom surface) of the printed circuit board 410. The RFIC 452 may be configured to process a signal of a selected frequency band, which is transmitted/received through the antenna array 630.

According to various embodiments, the RFIC 452 may be disposed on a bottom surface (e.g., a second surface) of the second board 602 (e.g., a dielectric body) and may be electrically connected to the printed circuit board 410 by using at least one second conductive connection member 605 (e.g., solder) provided on a top surface (e.g., a first surface) of the second board 602.

Figure 7A:
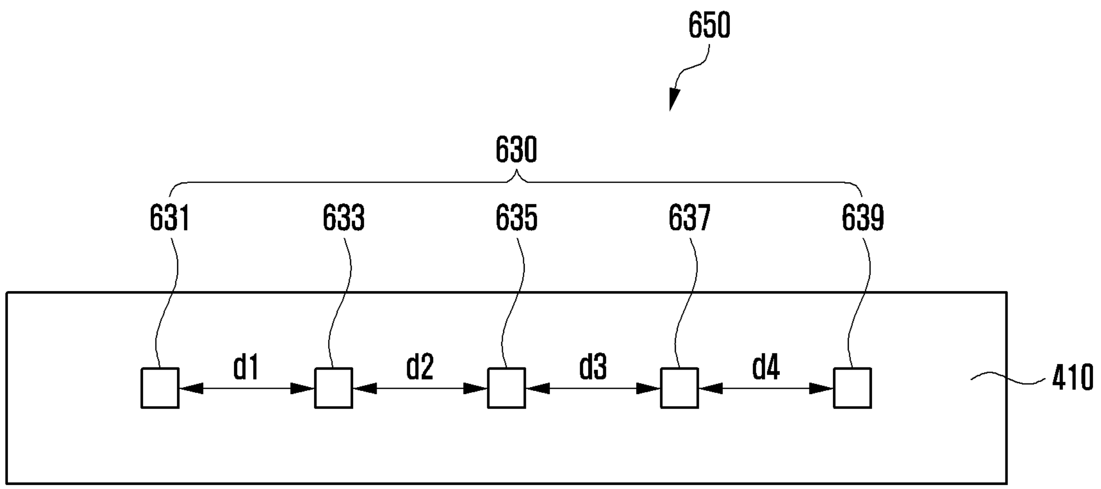
FIG. 7A is a view illustrating an embodiment regarding disposition of antenna arrays included in an antenna module according to an embodiment.
Figure 7B:
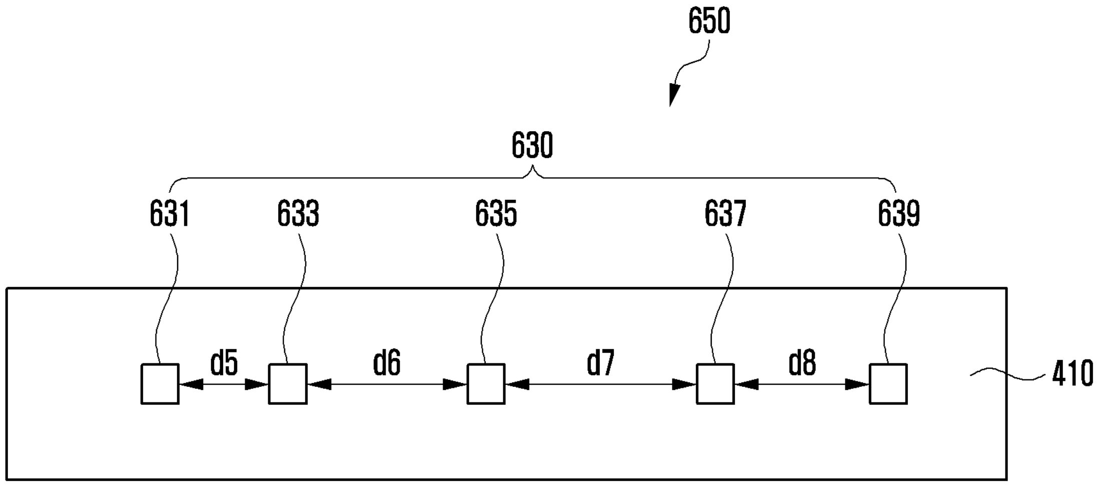
FIG. 7B is a view illustrating an embodiment regarding disposition of antenna arrays included in an antenna module according to various embodiments.

FIG. 7A is a view illustrating an embodiment regarding disposition of antenna arrays included in an antenna module according to an embodiment. FIG. 7B is a view illustrating another embodiment regarding disposition of antenna arrays included in an antenna module according to various embodiments.

Referring to FIG. 7A, an antenna array 630 of an antenna module 650 according to an embodiment may include, for example, a first conductive patch 631, a second conductive patch 633, a third conductive patch 635, a fourth conductive patch 637, and/or a fifth conductive patch 639.

According to an embodiment, the first conductive patch 631, the second conductive patch 633, the third conductive patch 635, the fourth conductive patch 637, and/or the fifth conductive patch 639 may be disposed at substantially equal intervals on the first surface (e.g., the top surface) of the printed circuit board 410. That is, the conductive patches 631, 633, 635, 637, 639 may be equally distributed or spaced along the printed circuit board 410 of the antenna module 650.

According to various embodiments, the first conductive patch 631 and the second conductive patch 633 may be disposed on the first surface (e.g., the top surface) of the printed circuit board 410 at a first interval d1. The second conductive patch 633 and the third conductive patch 635 may be disposed on the first surface (e.g., the top surface) of the printed circuit board 410 at a second interval d2. The third conductive patch 635 and the fourth conductive patch 637 may be disposed on the first surface (e.g., the top surface) of the printed circuit board 410 at a third interval d3. The fourth conductive patch 637 and the fifth conductive patch 639 may be disposed on the first surface (e.g., the top surface) of the printed circuit board 410 at a fourth interval d4.

According to various embodiments, the first interval d1, the second interval d2, the third interval d3, and the fourth interval d4 may be substantially equal to each other. For example, each of the first interval d1, the second interval d2, the third interval d3, and the fourth interval d4 may be about 4.95 mm to about 5.05 mm.

Referring to FIG. 7B, the antenna array 630 of the antenna module 650 according to an embodiment may include, for example, a first conductive patch 631, a second conductive patch 633, a third conductive patch 635, a fourth conductive patch 637, and/or a fifth conductive patch 639.

According to an embodiment and as shown in FIG. 7B, the first conductive patch 631, the second conductive patch 633, the third conductive patch 635, the fourth conductive patch 637, and/or the fifth conductive patch 639 may be disposed at unequal intervals on the first surface (e.g., the top surface) of the printed circuit board 410.

According to various embodiments, the first conductive patch 631 and the second conductive patch 633 may be disposed on the first surface (e.g., the top surface) of the printed circuit board 410 at a fifth interval d5. The second conductive patch 633 and the third conductive patch 635 may be disposed on the first surface (e.g., the top surface) of the printed circuit board 410 at a sixth interval d6. The third conductive patch 635 and the fourth conductive patch 637 may be disposed on the first surface (e.g., the top surface) of the printed circuit board 410 at a seventh interval d7. The fourth conductive patch 637 and the fifth conductive patch 639 may be disposed on the first surface (e.g., the top surface) of the printed circuit board 410 at an eighth interval d8.

According to various embodiments, the fifth interval d5, the sixth interval d6, the seventh interval d7, and the eighth interval d8 may be substantially different or unequal to each other (e.g., as compared to the equal spacing of FIG. 7A). For example, the fifth interval d5 may be about 2.95 mm to about 3.05 mm. The sixth interval d6 may be about 4.95 mm to about 5.05 mm. The seventh interval d7 may be about 5.95 mm to about 6.05 mm. The eighth interval d8 may be about 3.95 mm to about 4.05 mm.

According to various embodiments, the first to eighth intervals d1 to d8 may have, for example, numerical values described above. However, it will be appreciated that intervals or spacing having various other numerical values may be applied without departing from the scope of the present disclosure.

Figure 8A:
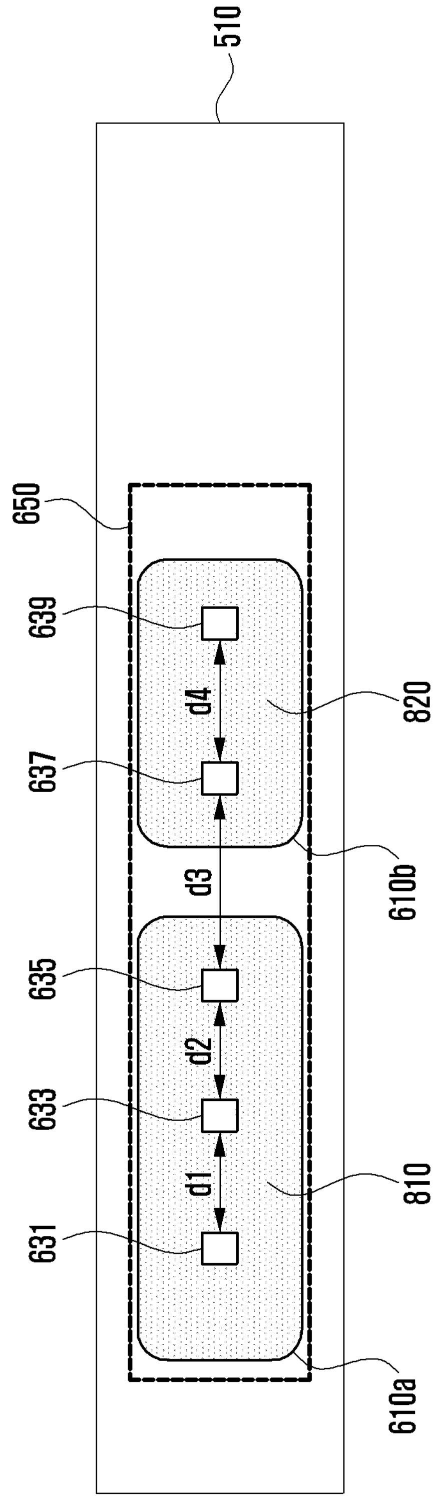
FIG. 8A is a view illustrating an embodiment in which an antenna module of an electronic device is disposed in a housing according to various embodiments.
Figure 8B:
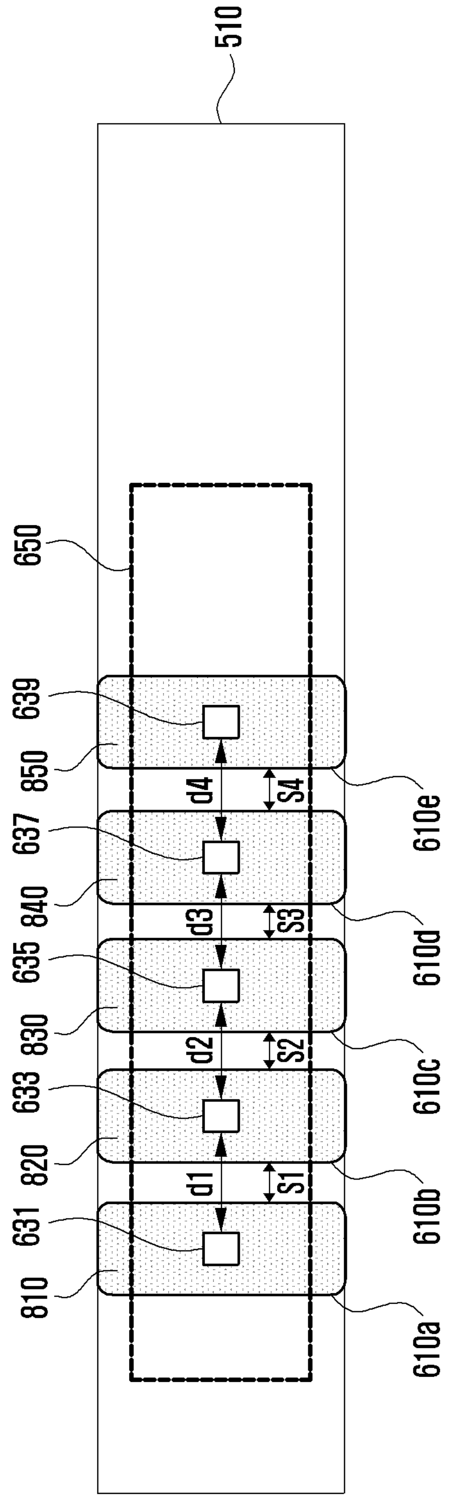
FIG. 8B is a view illustrating an embodiment in which an antenna module of an electronic device is disposed in a housing according to various embodiments.
Figure 8C:
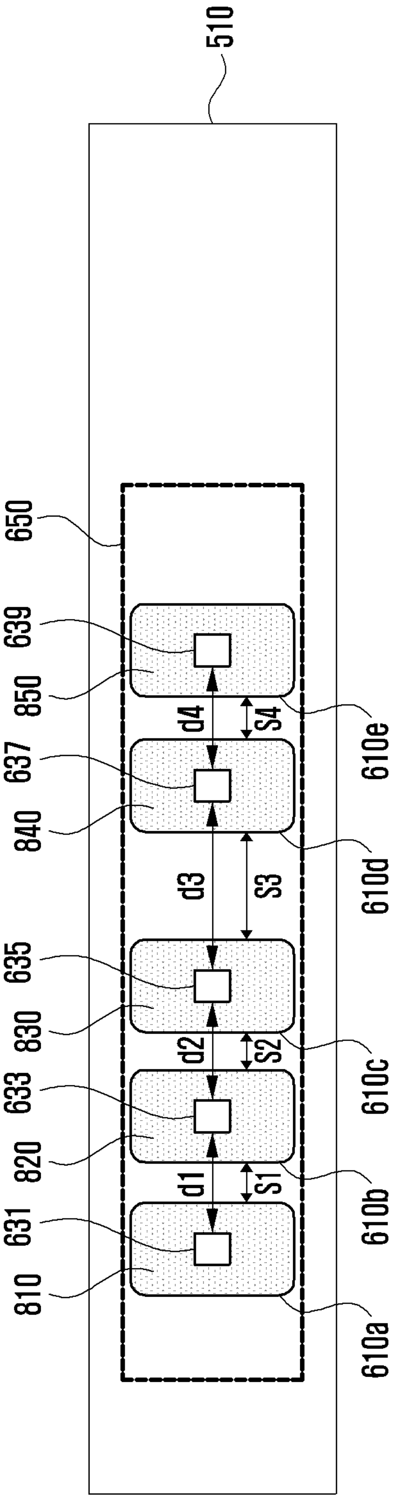
FIG. 8C is a view illustrating an embodiment in which an antenna module of an electronic device is disposed in a housing according to various embodiments.

FIGS. 8A-8C are views illustrating various embodiments in which an antenna module 650 of an electronic device is disposed in a housing 510 according to various embodiments.

In the embodiments illustrated in FIGS. 8A-8C, the length (or width) of the antenna module 650 in the first direction (e.g., the horizontal direction) may be about 25 mm to 27 mm, and the length (or width) in the second direction (e.g., the vertical direction) may be about 3.4 mm to 3.6 mm. In an embodiment, the length (or width) of the first conductive patch 631 in the first direction (e.g., the horizontal direction) may be about 1.9 mm to 2.1 mm, and the length (or width) in the second direction (e.g., the vertical direction) may be about 2.2 mm to 2.4 mm. The second conductive patch 633, the third conductive patch 635, the fourth conductive patch 637, and the fifth conductive patch 639 may each have substantially the same size as the first conductive patch 631.

Referring to FIG. 8A, the antenna module 650 may be disposed inside the housing 510 (e.g., the rear plate 511 and/or the side member 518) provided with the plurality of slits (e.g., the first slit 610*a* and the second slit 610*b* on the rear plate 511 or the first slit 611*a* and the second slit 611*b* on the side member 518).

According to an embodiment, and as shown in FIG. 8A, the plurality of slits provided in the housing 510 (e.g., the rear plate 511 and/or the side member 518) may include, for example, a first slit 610*a* and a second slit 610*b*. The first slit 610*a* and the second slit 610*b* may have different sizes. In an embodiment, the first slit 610*a* may be larger than the second slit 610*b*. For example, as shown in FIG. 8A, the first slit 610*a* shown in FIG. 8A has a larger horizontal direction size than the second slit 610*b*.

According to various embodiments, the first slit 610*a* may be filled with a first non-conductive injection-molded article 810 (e.g., a polymer). The second slit 610*b* may be filled with a second non-conductive injection-molded article 820 (e.g., a polymer). In some embodiments, the non-conductive injection-molded articles (e.g., polymers) may be the same or may be different from each other.

According to various embodiments, the first conductive patch 631, the second conductive patch 633, and the third conductive patch 635 of the antenna module 650 may be disposed in or relative to the first slit 610*a*. A fourth conductive patch 637 and a fifth conductive patch 639 may be disposed in or relative to the second slit 610*b*. In some embodiments of the present disclosure, the conductive patches may be embedded within the material that fills the slits. For example, in some embodiments, the conductive patches may be mounted to a respective circuit board on a first side of the respective conductive patch, and the opposite side of the conductive patch may be contained within the non-conductive injection-molded articles (e.g., polymers) of the slits. In other embodiments, the conductive patches may be arranged behind the material filling the slits.

According to various embodiments, the first conductive patch 631, the second conductive patch 633, and the third conductive patch 635 may be disposed in the first slit 610*a* at substantially equal intervals or substantially equal spacing. The fourth conductive patch 637 and the fifth conductive patch 639 may be disposed in the second slit 610*b* at unequal intervals or an unequal spacing (e.g., different from the spacing of the conductive pages 631, 633, 635 of the first slit 610*a*). The third conductive patch 635 disposed in the first slit 610*a* and the fourth conductive patch 637 disposed in the second slit 610*b* may be separated by a distance that is unequal to the spacing of the conductive patches 631, 633, 635 of the first slit 610*a* and the spacing of the conductive patches 637, 639 of the second slit 610*b*. The interval or spacing of the conductive patches 631, 633, 635 disposed in the first slit 610*a* may be different from the interval or spacing between the conductive patches 637, 639 disposed in the second slit 610*b*.

According to an embodiment, a first interval d1 between the first conductive patch 631 and the second conductive patch 633 disposed in the first slit 610*a*, and a second interval d2 between the second conductive patch 633 and the second conductive patch 635 in the first slit 610*a* may be substantially equal to each other. For example, the first interval d1 and the second interval d2 may be each about 4.95 mm to 5.05 mm. A fourth interval d4 between the fourth conductive patch 637 and the fifth conductive patch 639 disposed in the second slit 610*b* may be greater than the first interval d1 and/or the second interval d2. For example, the fourth interval d4 may be a spacing of about 5.45 mm to 5.55 mm. A third interval d3 between the third conductive patch 635 disposed in the first slit 610*a* and the fourth conductive patch 637 disposed in the second slit 610*b* may be different from the second interval d2 or the fourth interval d4. For example, the third interval d3 may be about 5.95 mm to 6.05 mm.

Referring to FIG. 8B, another configuration of an antenna module 650 is shown. The antenna module 650 of FIG. 8B may be disposed inside the housing 510 (e.g., the rear plate 511 and/or the side member 518) provided with a plurality of slits (e.g., a first slit 610*a*, a second slit 610*b*, a third slit 610*c*, a fourth slit 610*d*, and a fifth slit 610*e*).

According to an embodiment, the plurality of slits provided in the housing 510 (e.g., the rear plate 511 and/or the side member 518) may include, for example, a first slit 610*a*, a second slit 610*b*, a third slit 610*c*, a fourth slit 610*d*, and a fifth slit 610*e*. The first slit 610*a*, the second slit 610*b*, the third slit 610*c*, the fourth slit 610*d*, and the fifth slit 610*e* may have substantially the same size (e.g., horizontal dimensions are equal for each of the slits 610*a*, 610*b*, 610*c*, 610*d*, 610*e*). In another embodiment, the first slit 610*a*, the second slit 610*b*, the third slit 610*c*, the fourth slit 610*d*, and the fifth slit 610*e* may have different sizes, at least in the horizontal direction.

According to various embodiments, the first slit 610*a* may be filled with a first non-conductive injection-molded article 810 (e.g., a polymer). The second slit 610*b* may be filled with a second non-conductive injection-molded article 820 (e.g., a polymer). The third slit 610*c* may be filled with a third non-conductive injection-molded article 830 (e.g., a polymer). The fourth slit 610*d* may be filled with a fourth non-conductive injection-molded article 840 (e.g., a polymer). The fifth slit 610*e* may be filled with a fifth non-conductive injection-molded article 850 (e.g., a polymer). The polymers or non-conductive injection-molded articles may be selected to be substantially similar (e.g., same or similar material), or may be different from each other, or some may be the same while others are different.

According to various embodiments, the first conductive patch 631 may be disposed in the first slit 610*a*. The second conductive patch 633 may be disposed in the second slit 610*b*. The third conductive patch 635 may be disposed in the third slit 610*c*. The fourth conductive patch 637 may be disposed in the fourth slit 610*d*. The fifth conductive patch 639 may be disposed in the fifth slit 610*e*.

According to various embodiments, the first slit 610*a*, the second slit 610*b*, the third slit 610*c*, the fourth slit 610*d* and the fifth slit 610*e* may be provided in the housing 510 at substantially equal intervals or spacing (e.g., in the horizontal direction). For example, the first interval s1 between the first slit 610*a* and the second slit 610*b*, the second interval s2 between the second slit 610*b* and the third slit 610*c*, the third interval s3 between the third slit 610*c* and the fourth slit 610*d*, and the fourth interval s4 between the fourth slit 610*d* and the fifth slit 610*e* may be substantially equal to each other. In another embodiment, the first slit 610*a*, the second slit 610*b*, the third slit 610*c*, the fourth slit 610*d*, and the fifth slit 610*e* may be provided at unequal intervals or spacing.

According to various embodiments, the first conductive patch 631, the second conductive patch 633, the third conductive patch 635, the fourth conductive patch 637, and the fifth conductive patch 639 may be disposed in the first slit 610*a*, the second slit 610*b*, the third slit 610*c*, the fourth slit 610*d*, and the fifth slit 610*e* at substantially equal intervals.

According to various embodiments, and as shown in FIG. 8B, the first interval d1 between the first conductive patch 631 disposed in the first slit 610*a* and the second conductive patch 633 disposed in the second slit 610*b*, the second interval d2 between the second conductive patch 633 disposed in the second slit 610*b* and the third conductive patch 635 disposed in the third slit 610*c*, the third interval d3 between the third conductive patch 635 disposed in the third slit 610*c* and the fourth conductive patch 637 disposed in the fourth slit 610*d*, and the fourth interval d4 between the fourth conductive patch 637 disposed in the fourth slit 610*d* and the fifth conductive patch 639 disposed in the fifth slit 610*e* may be substantially equal to each other. For example, each of the first interval d1, the second interval d2, the third interval d3, and the fourth interval d4 may be about 4.95 mm to about 5.05 mm. In another embodiment, the first interval d1, the second interval d2, the third interval d3, and/or the fourth interval d4 may be different from each other.

Referring now to FIG. 8C, an antenna module 650 may be disposed inside the housing 510 (e.g., the rear plate 511 and/or the side member 518) provided with a plurality of slits (e.g., the first slit 610*a*, the second slit 610*b*, the third slit 610*c*, the fourth slit 610*d*, and the fifth slit 610*e*), but with uneven spacing or intervals.

According to an embodiment and as shown in FIG. 8C, the plurality of slits provided in the housing 510 (e.g., the rear plate 511 and/or the side member 518) may include, for example, a first slit 610*a*, a second slit 610*b*, a third slit 610*c*, a fourth slit 610*d*, and a fifth slit 610*e*. The first slit 610*a*, the second slit 610*b*, the third slit 610*c*, the fourth slit 610*d*, and the fifth slit 610*e* may have substantially the same size (e.g., in the horizontal dimension). In another embodiment, the first slit 610*a*, the second slit 610*b*, the third slit 610*c*, the fourth slit 610*d*, and the fifth slit 610*e* may have different sizes.

Similar to the embodiment of FIG. 8B, and according to various embodiments, the first slit 610*a* may be filled with a first non-conductive injection-molded article 810 (e.g., a polymer). The second slit 610*b* may be filled with a second non-conductive injection-molded article 820 (e.g., a polymer). The third slit 610*c* may be filled with a third non-conductive injection-molded article 830 (e.g., a polymer). The fourth slit 610*d* may be filled with a fourth non-conductive injection-molded article 840 (e.g., a polymer). The fifth slit 610*e* may be filled with a fifth non-conductive injection-molded article 850 (e.g., a polymer). The polymers or non-conductive injection-molded articles may be selected to be substantially similar (e.g., same or similar material), or may be different from each other, or some may be the same while others are different.

According to various embodiments, the first conductive patch 631 may be disposed in the first slit 610*a*. The second conductive patch 633 may be disposed in the second slit 610*b*. The third conductive patch 635 may be disposed in the third slit 610*c*. The fourth conductive patch 637 may be disposed in the fourth slit 610*d*. The fifth conductive patch 639 may be disposed in the fifth slit 610*e*.

According to various embodiments, some of the first slit 610*a*, the second slit 610*b*, the third slit 610*c*, the fourth slit 610*d* and the fifth slit 610*e* may be provided at substantially equal intervals, and the other ones may be provided at unequal intervals. For example, a first interval s1 between the first slit 610*a* and a second slit 610*b* and the second interval s2 between the second slit 610*b* and the third slit 610*c* may be substantially equal to each other.

According to various embodiments, a third interval s3 between the third slit 610*c* and the fourth slit 610*d* may be different from the first interval s1 or the second interval s2. For example, the third interval s3 between the third slit 610*c* and the fourth slit 610*d* may be greater or smaller than the first interval s1 or the second interval s2. A fourth interval s4 between the fourth slit 610*d* and the fifth slit 610*e* may be substantially equal to the first interval s1 or the second interval s2, or may be different therefrom.

According to various embodiments, the first conductive patch 631, the second conductive patch 633, the third conductive patch 635, the fourth conductive patch 637, and the fifth conductive patch 639 may be disposed in the first slit 610*a*, the second slit 610*b*, the third slit 610*c*, the fourth slit 610*d*, and the fifth slit 610*e*, respectively.

According to various embodiments, the first interval d1 between the first conductive patch 631 disposed in the first slit 610*a* and the second conductive patch 633 disposed in the second slit 610*b*, and the second interval d2 between the second conductive patch 633 disposed in the second slit 610*b* and the third conductive patch 635 disposed in the third slit 610*c* may be substantially equal to each other. For example, the first interval d1 and the second interval d2 may be each about 4.95 mm to 5.05 mm.

According to various embodiments, the third interval d3 between the third conductive patch 635 disposed in the third slit 610*c* and the fourth conductive patch 637 disposed in the fourth slit 610*d* may be different from the first interval d1 or the second interval d2. For example, the third interval d3 between the third conductive patch 635 and the fourth conductive patch 637 may be greater than the first interval d1 or the second interval d2. For example, the third interval d3 may be about 5.95 mm to 6.05 mm. In another embodiment, the third interval d3 between the third conductive patch 635 and the fourth conductive patch 637 may be smaller than the first interval d1 or the second interval d2. For example, the third interval d3 may be about 2.95 mm to about 3.05 mm. The fourth interval d4 between the fourth conductive patch 637 disposed in the fourth slit 610*d* and the fifth conductive patch 639 disposed in the fifth slit 610*e* may be substantially equal to the first interval d1 or the second interval d2.

Figure 9A:
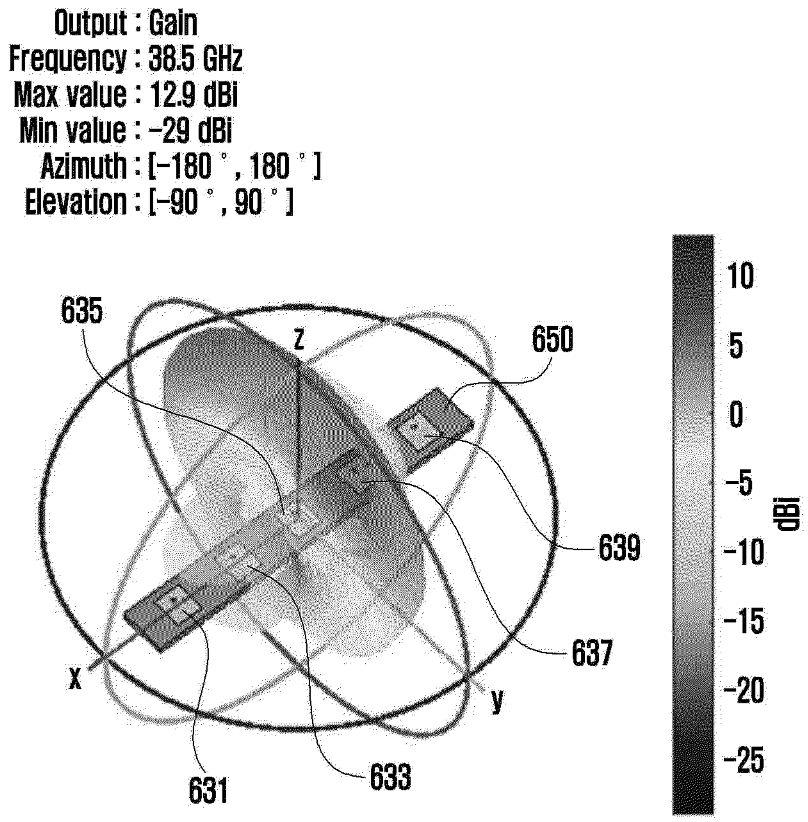
FIG. 9A is a schematic illustration provided for explaining a gain of an antenna module when antenna arrays according to various embodiments are disposed at substantially equal intervals.
Figure 9B:
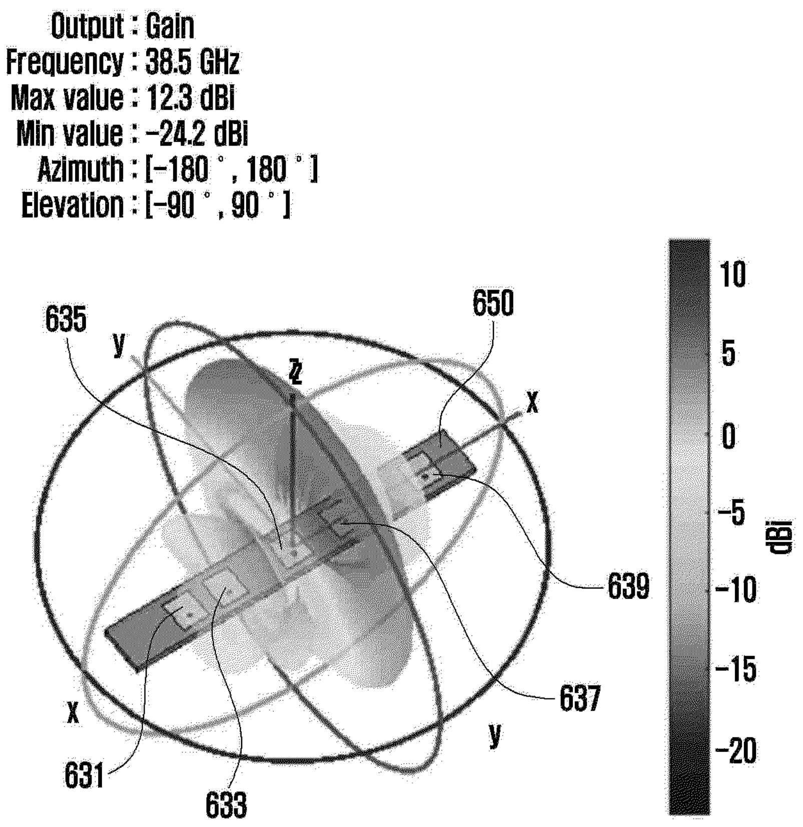
FIG. 9B is a schematic illustration provided for explaining a gain of an antenna module when antenna arrays according to various embodiments are disposed at substantially unequal intervals.

FIGS. 9A and 9B are views provided for explaining a gain of an antenna module when antenna arrays according to various embodiments are disposed at substantially equal or unequal intervals. The conductive patches of an array are disposed at substantially equal or unequal intervals, such as shown and described with respect to FIGS. 7A-7B, 8A-8C.

According to various embodiments, FIG. 9A illustrates a view showing a gain, when the conductive arrays 630 (e.g., the first conductive patch 631, the second conductive patch 633, the third conductive patch 635, the fourth conductive patch 637, and the fifth conductive patch 639) of the antenna module 650 are disposed at substantially equal intervals, for example, as illustrated in FIGS. 7A and 8B. FIG. 9B illustrates a view showing a gain, when at least some of the conductive arrays 630 (e.g., the first conductive patch 631, the second conductive patch 633, the third conductive patch 635, the fourth conductive patch 637, and the fifth conductive patch 639) of the antenna module 650 are disposed at unequal intervals, for example, as illustrated in FIGS. 7B and 8C.

In an embodiment, referring to FIG. 9A, it can be seen that, when the conductive arrays 630 (e.g., the first conductive patch 631, the second conductive patch 633, the third conductive patch 635, the fourth conductive patch 637, and the fifth conductive patch 639) of the antenna module 650 are disposed at substantially equal intervals, the maximum gain value of the antenna module 650 is about 12.9 dBi.

In an embodiment, referring to FIG. 9B, it can be seen that, when at least some of the conductive arrays 630 (e.g., the first conductive patch 631, the second conductive patch 633, the third conductive patch 635, the fourth conductive patch 637, and the fifth conductive patch 639) of the antenna module 650 are disposed at unequal intervals, the maximum gain value of the antenna module 650 is about 12.3 dBi.

According to various embodiments, it can be seen that the difference between the maximum gain value when the antenna arrays 630 of the antenna module 650 are arranged at substantially equal intervals as illustrated in FIG. 9A and the maximum gain value when at least some of the antenna arrays 630 of the antenna module 650 are arranged at unequal intervals as illustrated in FIG. 9B is about 0.6 dBi, and thus the difference between the maximum gain values of the antenna modules 650 is weak.

Figure 10:
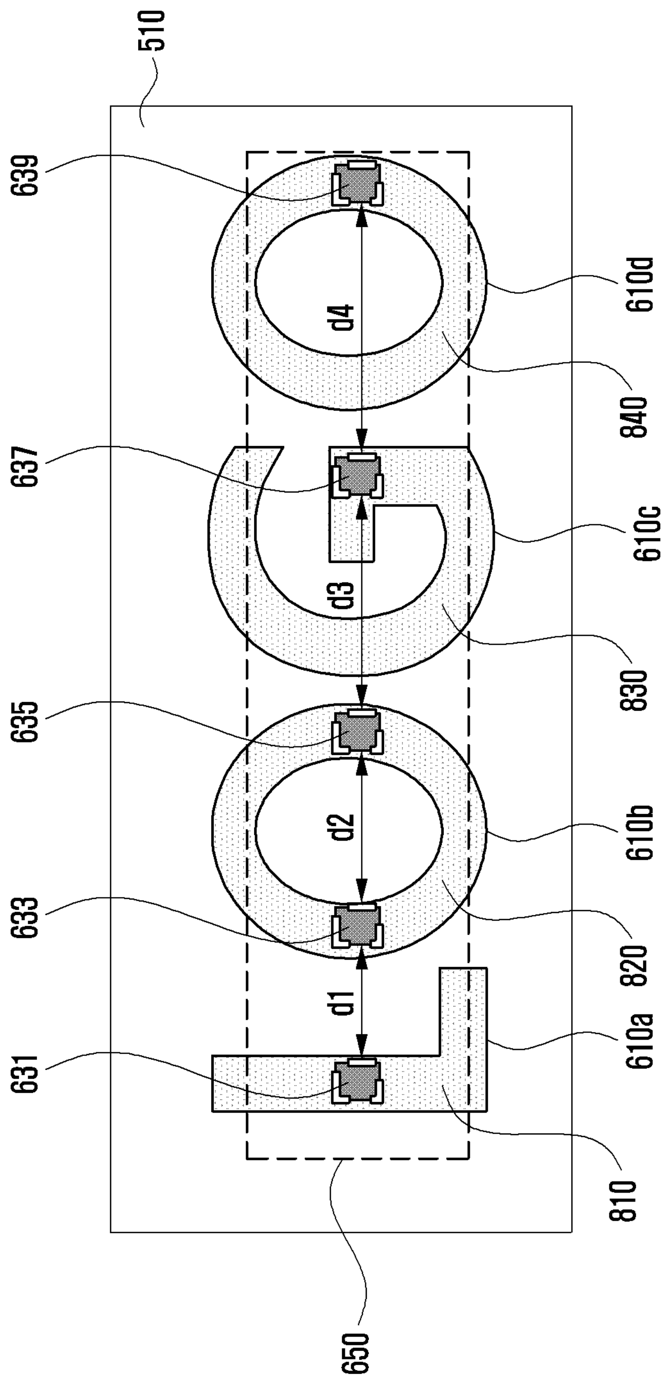
FIG. 10 is a view illustrating an embodiment in which an antenna module of an electronic device according to various embodiments is disposed in a housing.

FIG. 10 is a view illustrating an embodiment in which an antenna module 650 of an electronic device according to various embodiments is disposed in a housing 510.

Referring to FIG. 10, the antenna module 650 may be disposed inside the housing 510 (e.g., the rear plate 511 and/or the side member 518) provided with a plurality of slits (e.g., a first slit 610*a*, a second slit 610*b*, a third slit 610*c*, and a fourth slit 610*d*). In an embodiment, the antenna module 650 may at least partially overlap the plurality of slits (e.g., the first slit 610*a*, the second slit 610*b*, the third slit 610*c*, and the fourth slit 610*d*) and may be disposed inside the housing 510.

According to an embodiment, the plurality of slits provided in the housing 510 (e.g., the rear plate 511 and/or the side member 518) may include, for example, a first slit 610*a*, a second slit 610*b*, a third slit 610*c*, and a fourth slit 610*d*. The first slit 610*a*, the second slit 610*b*, the third slit 610*c*, and the fourth slit 610*d* may be provided in the housing 510 (e.g., the rear plate 511 and/or the side member 518) in different sizes and/or different shapes.

According to various embodiments, the plurality of slits (e.g., the first slit 610$a$, the second slit 610$b$, the third slit 610$c$, and the fourth slit 610$d$) provided in the housing 510 (e.g., the rear plate 511 and/or the side member 518) may include or form a company logo and/or a product name of the electronic device 500.

As illustrated in FIG. 10, the plurality of slits (e.g., the first slit 610$a$, the second slit 610$b$, the third slit 610$c$, and the fourth slit 610$d$) provided in the housing 510 (e.g., the rear plate 511 and/or the side member 518) may be provided in the form of the word "LOGO". As shown, the first slit 610$a$ may be provided in the form of the letter "L". The second slit 610$b$ may be provided in the form of the letter "O". The third slit 610$c$ may be provided in the form of the letter "G". The fourth slit 610$d$ may be provided in the form of the letter "O".

According to various embodiments, the first slit 610$a$ (e.g., "L") may be filled with a first non-conductive injection-molded article 810 (e.g., a polymer). The second slit 610$b$ (e.g., "O") may be filled with a second non-conductive injection-molded article 820 (e.g., a polymer). The third slit 610$c$ (e.g., "G") may be filled with a third non-conductive injection-molded article 830 (e.g., a polymer). The fourth slit 610$d$ (e.g., "O") may be filled with a fourth non-conductive injection-molded article 840 (e.g., a polymer).

According to various embodiments, a first conductive patch 631 may be disposed in the first slit 610$a$ (e.g., "L"). A second conductive patch 633 and a third conductive patch 635 may be disposed in the second slit 610$b$ (e.g., "0"). A fourth conductive patch 637 may be disposed in the third slit 610$c$ (e.g., "G"). A fifth conductive patch 639 may be disposed in the fourth slit 610$d$ (e.g., "O").

According to various embodiments, a width of the first non-conductive injection-molded article 810 may be wider than the width of the first conductive patch 631. The width of the second non-conductive injection-molded article 820 may be wider than the widths of the second conductive patch 633 and the third conductive patch 635. The width of the third non-conductive injection-molded article 830 may be wider than the width of the fourth conductive patch 637. The width of the fourth non-conductive injection-molded article 840 may be wider than the width of the fifth conductive patch 639. As such, the conductive patches 631, 633, 635, 637, 639 may be arranged completely behind or in the respective non-conductive injection-molded articles 810, 820, 830, 840.

In an embodiment of the present disclosure, the first conductive patch 631, the second conductive patch 633, the third conductive patch 635, the fourth conductive patch 637, and the fifth conductive patch 639 are illustrated as having a quadrilateral shape. However, such geometry of the conductive patches 631, 633, 635, 637, 639 is not limited to such geometries and may be configured in various shapes such as bar shapes (e.g., a dipole antenna) and polygonal shapes.

According to various embodiments, some of the first slit 610$a$, the second slit 610$b$, the third slit 610$c$, and the fourth slit 610$d$ may be provided in the housing 510 at substantially equal intervals, and the other ones may be provided at unequal intervals.

According to various embodiments, the first interval d1 between the first conductive patch 631 disposed in the first slit 610$a$ and the second conductive patch 633 disposed in the second slit 610$b$, the second interval d2 between the second conductive patch 633 and the third conductive patch 635 disposed in the second slit 610$b$, the third interval d3 between the third conductive patch 635 disposed in the second slit 610$b$ and the fourth conductive patch 637 disposed in the third slit 610$c$, and the fourth interval d4 between the fourth conductive patch 637 disposed in the third slit 610$c$ and the fifth conductive patch 639 disposed in the fourth slit 610$d$ may be different from each other. In another embodiment, some of the first interval d1, the second interval d2, the third interval d3, and the fourth interval d4 may equal to each other, and some may be different from each other.

Figure 11:
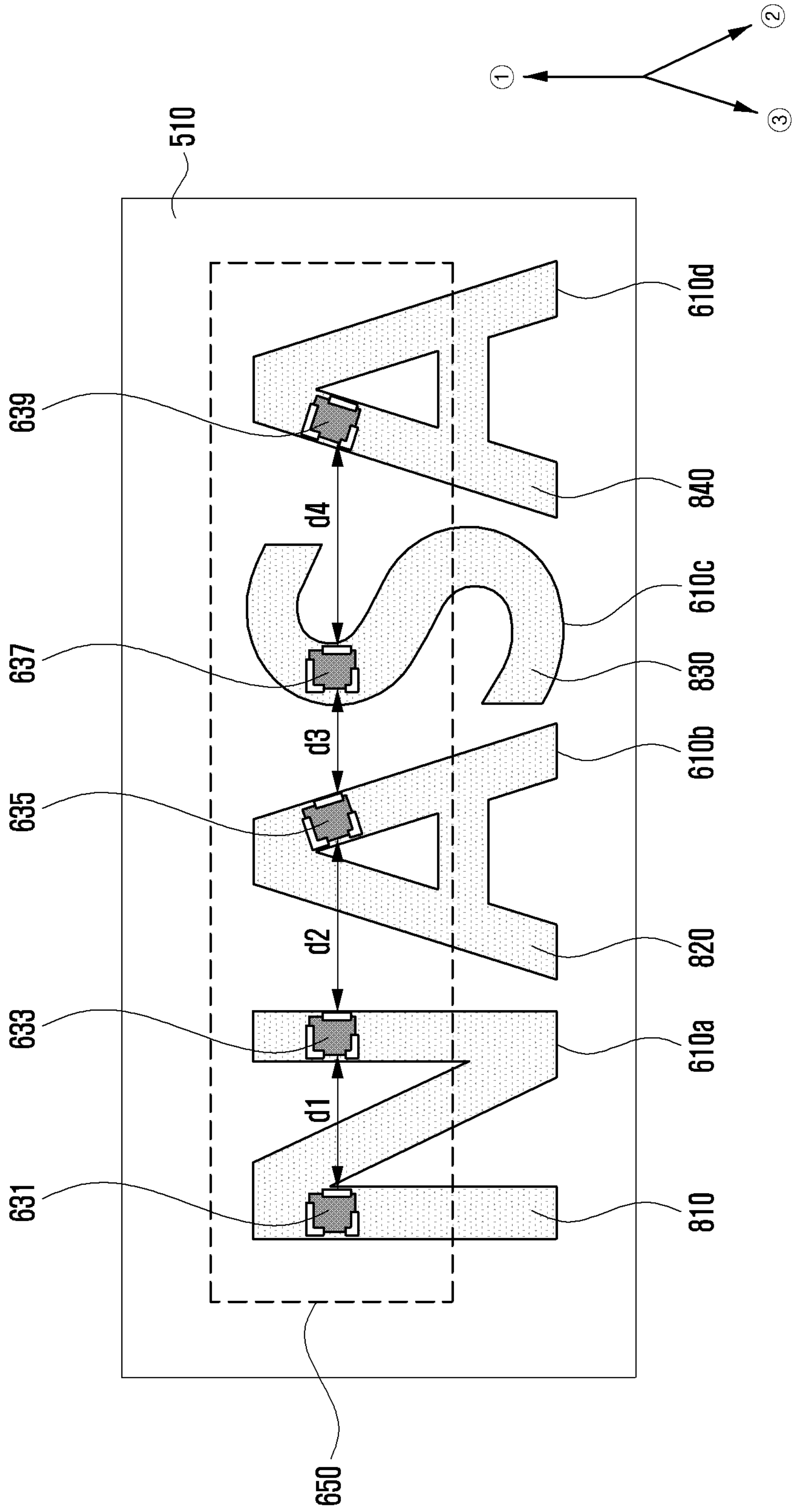
FIG. 11 is a view illustrating embodiments in which an antenna module of an electronic device is disposed in a housing according to various embodiments.

FIG. 11 is a view illustrating an embodiment in which an antenna module 650 of an electronic device is disposed in a housing 610 according to various embodiments.

Referring to FIG. 11, the antenna module 650 may be disposed inside the housing 510 (e.g., the rear plate 511 and/or the side member 518) provided with a plurality of slits (e.g., a first slit 610$a$, a second slit 610$b$, a third slit 610$c$, and a fourth slit 610$d$). In an embodiment, the antenna module 650 may overlap the plurality of slits (e.g., the first slit 610$a$, the second slit 610$b$, the third slit 610$c$, and the fourth slit 610$d$) and may be disposed inside the housing 510.

According to an embodiment, the plurality of slits provided in the housing 510 (e.g., the rear plate 511 and/or the side member 518) may include, for example, a first slit 610$a$, a second slit 610$b$, a third slit 610$c$, and a fourth slit 610$d$. The first slit 610$a$, the second slit 610$b$, the third slit 610$c$, and the fourth slit 610$d$ may be provided in the housing 510 (e.g., the rear plate 511 and/or the side member 518) in different sizes and/or different shapes.

According to various embodiments, the plurality of slits (e.g., the first slit 610$a$, the second slit 610$b$, the third slit 610$c$, and the fourth slit 610$d$) provided in the housing 510 (e.g., the rear plate 511 and/or the side member 518) may be provided in the form of, for example, the word or log "NASA". For example, the first slit 610$a$ may be provided in the form of the letter "N". The second slit 610$b$ may be provided in the form of the letter "A". The third slit 610$c$ may be provided in the form of the letter "S". The fourth slit 610$d$ may be provided in the form of the letter "A".

According to various embodiments, the first slit 610$a$ (e.g., "N") may be filled with a first non-conductive injection-molded article 810 (e.g., a polymer). The second slit 610$b$ (e.g., "A") may be filled with a second non-conductive injection-molded article 820 (e.g., a polymer). The third slit 610$c$ (e.g., "S") may be filled with a third non-conductive injection-molded article 830 (e.g., a polymer). The fourth slit 610$d$ (e.g., "A") may be filled with a fourth non-conductive injection-molded article 840 (e.g., a polymer).

According to various embodiments, a first conductive patch 631 and a second conductive patch 633 may be disposed in the first slit 610$a$ (e.g., "N"). A third conductive patch 635 may be disposed in the second slit 610$b$ (e.g., "A"). A fourth conductive patch 637 may be disposed in the third slit 610$c$ (e.g., "S"). A fifth conductive patch 639 may be disposed in the fourth slit 610$d$ (e.g., "A").

According to various embodiments, the width of the first non-conductive injection-molded article 810 may be wider than the widths of the first conductive patch 631 and the second conductive patch 633. The width of the second non-conductive injection-molded article 820 may be wider than the width of the third conductive patch 635. The width of the third non-conductive injection-molded article 830 may be wider than the width of the fourth conductive patch 637. The width of the fourth non-conductive injection-molded article 840 may be wider than the width of the fifth conductive patch 639.

In an embodiment of the present disclosure, the first conductive patch 631, the second conductive patch 633, the third conductive patch 635, the fourth conductive patch 637, and the fifth conductive patch 639 are illustrated as having a quadrilateral shape, but such geometry is not limited thereto and may be configured in various shapes such as a bar shape (e.g., a dipole antenna) and a polygonal shape.

According to various embodiments, the first conductive patch 631 and the second conductive patch 633 disposed in the first slit 610*a* (e.g., "N"), and the fourth conductive patch 637 disposed in third slit 610*c* (e.g., "S") may be disposed to be aligned in a direction X (e.g., a vertical axis direction) according to the shape of the slit.

According to various embodiments, the third conductive patch 635 disposed in the second slit 610*b* (e.g., "A") may be disposed to be inclined or angled, for example, in a direction @ (e.g., rightward from the vertical axis). The fifth conductive patch 639 disposed in the fourth slit 610*d* (e.g., "A") may be disposed to be inclined or angled in a direction @ (e.g., leftward from the vertical axis). As such, the relative orientation between the different conductive patches 631, 633, 635, 637, 639 is not required to be the same between different conductive patches 631, 633, 635, 637, 639. That is, not all conductive patches 631, 633, 635, 637, 639 need to be orientated or angled at the same direction or parallel with each other. Accordingly, in accordance with some embodiments, at least one conductive patch may be disposed on the first surface of the printed circuit board and inclined at an angle relative to the other conductive patches.

According to various embodiments, some of the first slit 610*a*, the second slit 610*b*, the third slit 610*c*, and the fourth slit 610*d* may be provided in the housing 510 at substantially equal intervals, and the other ones may be provided at unequal intervals.

According to various embodiments, the first interval d1 between the first conductive patch 631 and the second conductive patch 633 disposed in the first slit 610*a*, the second interval d2 between the second conductive patch 633 disposed in the first slit 610*a* and the third conductive patch 635 disposed in the second slit 610*b*, the third interval d3 between the third conductive patch 635 disposed in the second slit 610*b* and the fourth conductive patch 637 disposed in the third slit 610*c*, and the fourth interval d4 between the fourth conductive patch 637 disposed in the third slit 610*c* and the fifth conductive patch 639 disposed in the fourth slit 610*d* may be different from each other. In another embodiment, some of the first interval d1, the second interval d2, the third interval d3, and the fourth interval d4 may be equal to each other, and some may be different from each other.

Figure 12:
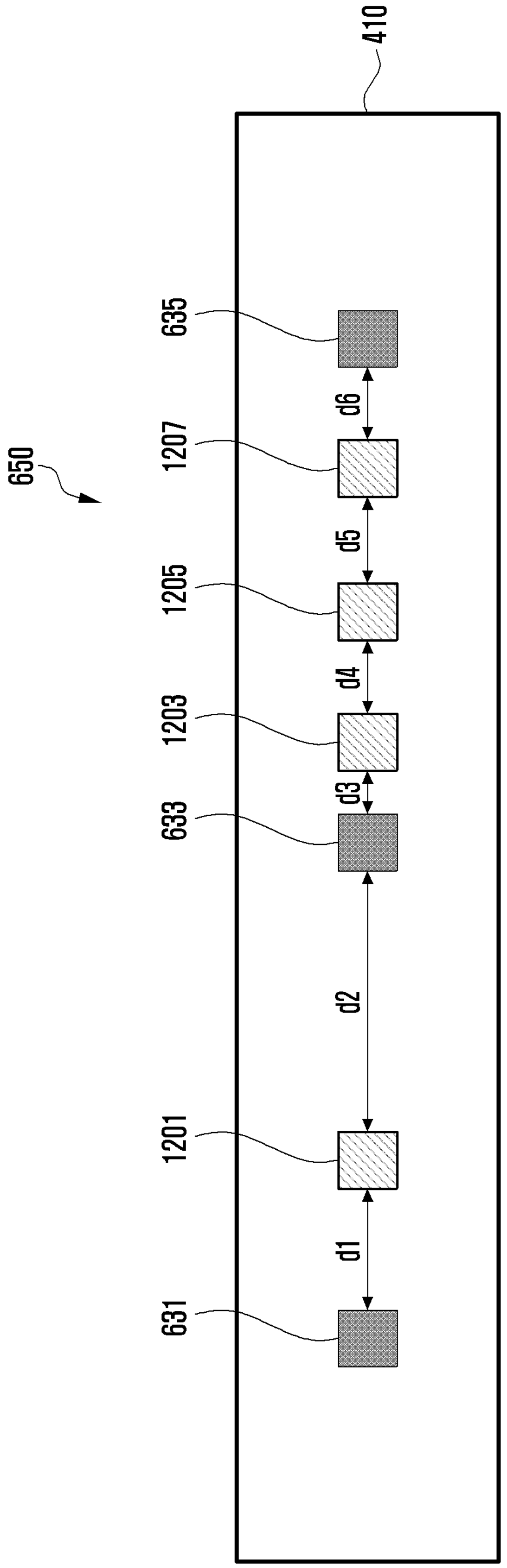
FIG. 12 is a view illustrating an embodiment in which an antenna module according to various embodiments includes antenna arrays operating in different frequency bands.

FIG. 12 is a view illustrating an embodiment in which an antenna module 650 according to various embodiments includes antenna arrays operating in different frequency bands.

Referring to FIG. 12, the antenna module 650 according to an embodiment may include a first conductive patch 631, a second conductive patch 633, a third conductive patch 635, a fourth conductive patch 1201, a fifth conductive patch 1203, a sixth conductive patch 1205, and a seventh conductive patch 1207 on a first surface (e.g., the top surface) of a printed circuit board 410.

According to an embodiment, the first conductive patch 631, the second conductive patch 633, and the third conductive patch 635 may be disposed on the first surface of the printed circuit board 410 at substantially equal intervals. That is, a distance between the first conductive patch 631 and the second conductive patch 633 is equal to a distance between the second conductive patch 633 and the third conductive patch 635. The first conductive patch 631, the second conductive patch 633, and the third conductive patch 635 may operate in a first frequency band.

According to an embodiment, the fourth conductive patch 1201, the fifth conductive patch 1203, the sixth conductive patch 1205, and the seventh conductive patch 1207 may be disposed on the first surface of the printed circuit board 410 at unequal intervals. The fourth conductive patch 1201, the fifth conductive patch 1203, the sixth conductive patch 1205, and the seventh conductive patch 1207 may operate in a second frequency band.

According to various embodiments, the fourth conductive patch 1201 may be disposed between the first conductive patch 631 and the second conductive patch 633. A first interval d1 between the first conductive patch 631 and the fourth conductive patch 1201 may be different from a second interval d2 between the fourth conductive patch 1201 and the second conductive patch 633. For example, compared to a first interval d1 between the first conductive patch 631 and the fourth conductive patch 1201, a second interval d2 between the fourth conductive patch 1201 and the second conductive patch 633 may be wider or larger.

According to various embodiments, the fifth conductive patch 1203, the sixth conductive patch 1205, and the seventh conductive patch 1207 may be disposed between the second conductive patch 633 and the third conductive patch 635. A third interval d3 between the second conductive patch 633 and the fifth conductive patch 1203, a fourth interval d4 between the fifth conductive patch 1203 and the sixth conductive patch 1205, a fifth interval d5 between the sixth conductive patch 1205 and the seventh conductive patch 1207, and a sixth interval d6 between the seventh conductive patch 1207 and the third conductive patch 635 may be different from each other (e.g., unequal intervals). As another embodiment, some of the third interval d3 between the second conductive patch 633 and the fifth conductive patch 1203, the fourth interval d4 between the fifth conductive patch 1203 and the sixth conductive patch 1205, the fifth interval d5 between the sixth conductive patch 1205 and the seventh conductive patch 1207, and the sixth interval d6 between the seventh conductive patch 1207 and the third conductive patch 635 may be different from each other, and some may equal to each other.

According to various embodiments, in the antenna module 650, a first conductive patch 631, a second conductive patch 633, and a third conductive patch 635, which operate in a first frequency band, and a fourth conductive patch 1201, a fifth conductive patch 1203, a sixth conductive patch 1205, and a seventh conductive patch 1207, which operate in a second frequency band, may be disposed on the first surface (e.g., the top surface) of the printed circuit board 410 to be arranged at substantially equal and/or unequal intervals.

According to various embodiments, in the antenna module 650, because the first conductive patch 631, the second conductive patch 633, and the third conductive patch 635, which operate in the first frequency band, and the fourth conductive patch 1201, the fifth conductive patch 1203, the sixth conductive patch 1205, and the seventh conductive patch 1207, which operate in the second frequency band, may be disposed on the first surface (e.g., the top surface) of the printed circuit board 410 to be arranged at substantially equal and/or unequal intervals, it is possible to implement a broadband characteristic.

According to various embodiments, the antenna module 650 may include a plurality of conductive patterns (e.g., conductive patches), and different combinations of antenna patterns may be used depending on the band of a RF signal applied to the antenna module 650.

The electronic device 500 according to various embodiments may include: a housing 510; a wireless communication module 192; a plurality of slits (e.g., 610*a*, 610*b*, 610*c*, 610*d*, 610*e*) provided in the housing 510; and an antenna module 650 disposed inside the housing 510 to correspond to the plurality of slits and operatively connected to the wireless communication module 192, wherein the antenna module 650 may include: a printed circuit board 410; a plurality of conductive patches (e.g., 631, 633, 635, 637, 639) disposed on a first surface of the printed circuit board 410; and an RFIC 452 disposed on a second surface of the printed circuit board 410, wherein the plurality of conductive patches may be configured to be disposed in the plurality of slits.

According to various embodiments, the housing 510 may include: a front plate 502 oriented in a first direction; a rear plate 511 oriented in a second direction opposite to the first direction; and a side member 518 surrounding an internal space defined between the front plate 502 and the rear plates 511.

According to various embodiments, the antenna module 650 may be disposed inside the rear plate 511 and/or the side member 518.

According to various embodiments, the plurality of conductive patches (e.g., 631, 633, 635, 637, 639) may be disposed on the first surface of the printed circuit board 410 at substantially equal intervals.

According to various embodiments, the plurality of conductive patches (e.g., 631, 633, 635, 637, 639) may be disposed on the first surface of the printed circuit board 410 at substantially unequal intervals.

According to various embodiments, the plurality of slits (e.g., 610*a*, 610*b*, 610*c*, 610*d*, and 610*e*) may be provided in the housing 510 in different sizes and/or different shapes.

According to various embodiments, the plurality of slits (e.g., 610*a*, 610*b*, 610*c*, 610*d*, 610*e*) may be configured to be filled with non-conductive injection-molded articles.

According to various embodiments, the plurality of slits (e.g., 610*a*, 610*b*, 610*c*, 610*d*, 610*e*) may be provided in the housing 510 at substantially equal and/or unequal intervals.

According to various embodiments, the plurality of conductive patches (e.g., 631, 633, 635, 637, 639) disposed in the plurality of slits (e.g., 610*a*, 610*b*, 610*c*, 610*d*, 610*e*) may be disposed at substantially equal and/or unequal intervals.

According to various embodiments, at least one of the plurality of conductive patches (e.g., 631, 633, 635, 637, 639) disposed in the plurality of slits (e.g., 610*a*, 610*b*, 610*c*, 610*d*, 610*e*) may be disposed on the first surface of the printed circuit board 410 to be inclined or angled relative to others of the conductive patches.

According to various embodiments, at least one conductive patch (e.g., 631, 633, 635) among the plurality of conductive patches may be configured to operate in a first frequency band, and at least one other patch (e.g., 1201, 1203, 1205, 1207) among the plurality of conductive patches may be configured to operate in a second frequency band.

According to various embodiments, the plurality of conductive patches (e.g., 631, 633, 635) operating in the first frequency band and the plurality of conductive patches (e.g., 1201, 1203, 1205, 1207) operating in the second frequency band may be disposed on the first surface of the printed circuit board 410 to be mixed or arranged at substantially equal and/or unequal intervals.

According to various embodiments, a first conductive patch 631, a second conductive patch 633, and a third conductive patch 635 are provided in a first slit 610*a* among the plurality of slits (e.g., 610*a*, 610*b*), and a fourth conductive patch 637 and a fifth conductive patch 639 may be disposed in a second slit 610*b*.

In the foregoing, the disclosure has been described with reference to various embodiments of the disclosure, but it is evident that changes and modifications made by a person ordinarily skilled in the art to which the disclosure belongs without departing from the technical spirit of the disclosure fall within the scope of the disclosure.

The use of the terms "a", "an", "the", and similar references in the context of description (especially in the context of the following claims) are to be construed to cover both the singular and the plural, unless otherwise indicated herein or specifically contradicted by context. The modifier "about" or "substantially" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

What is claimed is:

1. An electronic device comprising:

a housing;

a wireless communication module;

a plurality of slits provided in the housing; and an antenna module disposed inside the housing and positioned relative to the plurality of slits and operatively connected to the wireless communication module, wherein the antenna module includes:

a printed circuit board;

a plurality of conductive patches disposed on a first surface of the printed circuit board; and a radio frequency integrated circuit (RFIC) disposed on a second surface of the printed circuit board and electrically connected to each conductive patch of the plurality of conductive patches, wherein the plurality of conductive patches are configured to be disposed in the plurality of slits, and wherein the plurality of slits are provided in the housing in at least one of different sizes or different shapes.

2. The electronic device of claim 1, wherein the housing includes:

a front plate oriented in a first direction;

a rear plate oriented in a second direction opposite to the first direction; and a side member surrounding and defining an internal space between the front plate and the rear plate.

3. The electronic device of claim 2, wherein the antenna module is disposed inside one of the rear plate or the side member.

4. The electronic device of claim 1, wherein the plurality of conductive patches are disposed at substantially equal intervals on the first surface of the printed circuit board.

5. The electronic device of claim 1, wherein the plurality of conductive patches are disposed at unequal intervals on the first surface of the printed circuit board.

6. The electronic device of claim 1, wherein the plurality of slits are filled with non-conductive injection-molded articles.

7. The electronic device of claim 1, wherein the plurality of slits are provided in the housing at one of substantially equal or unequal intervals.

8. The electronic device of claim 7, wherein the plurality of conductive patches disposed in the plurality of slits are disposed at one or substantially equal or unequal intervals.

9. The electronic device of claim 1, wherein, among the plurality of conductive patches disposed in the plurality of slits, at least one conductive patch is disposed on the first surface of the printed circuit board to be inclined at an angle relative to the other conductive patches.

10. The electronic device of claim 1, wherein, among the plurality of conductive patches, at least one patch is configured to operate in a first frequency band and at least one other conductive patch is configured to operate in a second frequency band.

11. The electronic device of claim 10, wherein the at least one conductive patch operating in the first frequency band and the at least one conductive patch operating in the second frequency band are disposed on the first surface of the printed circuit board to be arranged at substantially equal or unequal intervals.

12. The electronic device of claim 1, wherein a first conductive patch, a second conductive patch, and a third conductive patch of the plurality of conductive patches are disposed in a first slit among the plurality of slits, and a fourth conductive patch and a fifth conductive patch of the plurality of patches are disposed in a second slit among the plurality of slits.

13. An antenna module comprising:

a printed circuit board;

a plurality of conductive patches disposed on a first surface of the printed circuit board; and a radio frequency integrated circuit (RFIC) disposed on a second surface of the printed circuit board and electrically connected to each conductive patch of the plurality of conductive patches, wherein the plurality of conductive patches are configured to be disposed in a plurality of slits provided in at least a portion of a housing of an electronic device, and wherein the plurality of slits are provided in the housing in at least one of different sizes or different shapes.

14. The antenna module of claim 13, wherein the plurality of conductive patches are disposed at substantially equal intervals on the first surface of the printed circuit board.

15. The antenna module of claim 13, wherein the plurality of conductive patches are disposed at unequal intervals on the first surface of the printed circuit board.

16. The antenna module of claim 13, wherein the plurality of slits are provided in the housing at least one of substantially equal or unequal intervals.

17. The antenna module of claim 13, wherein, among the plurality of conductive patches disposed in the plurality of slits, at least one conductive patch is disposed on the first surface of the printed circuit board to be inclined at an angle relative to the other conductive patches.

18. The antenna module of claim 13, wherein, among the plurality of conductive patches, at least one patch is configured to operate in a first frequency band and at least one other conductive patch is configured to operate in a second frequency band.

* * * * *